United States Patent
Hong et al.

(10) Patent No.: US 9,613,577 B2
(45) Date of Patent: Apr. 4, 2017

(54) DISPLAY DEVICE AND METHOD OF DRIVING THE SAME

(71) Applicant: Samsung Display Co., Ltd., Yongin, Gyeonggi-Do (KR)

(72) Inventors: Seokha Hong, Yongin-si (KR); Taejin Kim, Hwaseong-si (KR); Ahyoung Son, Seoul (KR); Bonghyun You, Yongin-si (KR); Jai-Hyun Koh, Hwaseong-si (KR); Sang-Uk Lim, Yongon-si (KR)

(73) Assignee: Samsung Display Co., Ltd. (KR)

( * ) Notice: Subject to any disclaimer, the term of this patent is extended or adjusted under 35 U.S.C. 154(b) by 189 days.

(21) Appl. No.: 14/557,003

(22) Filed: Dec. 1, 2014

(65) Prior Publication Data

US 2015/0348481 A1 Dec. 3, 2015

(30) Foreign Application Priority Data

Jun. 2, 2014 (KR) .................. 10-2014-0067090

(51) Int. Cl.
*G09G 3/36* (2006.01)
*G09G 3/20* (2006.01)

(52) U.S. Cl.
CPC ......... *G09G 3/3614* (2013.01); *G09G 3/2003* (2013.01); *G09G 3/3685* (2013.01); *G09G 2310/0218* (2013.01); *G09G 2320/0209* (2013.01); *G09G 2320/0247* (2013.01)

(58) Field of Classification Search
CPC .. G09G 3/2003; G09G 3/3607; G09G 3/2074; G09G 2300/0439; G09G 2300/0452; G09G 2300/0443; G09G 2300/0469; G09G 2300/0478

USPC .............................. 345/87, 88, 95, 204, 690
See application file for complete search history.

(56) References Cited

U.S. PATENT DOCUMENTS

| | | | | |
|---|---|---|---|---|
| 5,457,552 A | * | 10/1995 | Ogurtsov | ............ G02F 1/13624 345/93 |
| 8,587,504 B2 | | 11/2013 | Joo | |
| 2006/0197882 A1 | | 9/2006 | Oh et al. | |
| 2010/0188437 A1 | | 7/2010 | Itoh et al. | |

(Continued)

FOREIGN PATENT DOCUMENTS

| KR | 10-0972492 | 7/2010 |
|---|---|---|
| KR | 10-2011-0077899 | 7/2011 |

(Continued)

*Primary Examiner* — Jennifer Nguyen
(74) *Attorney, Agent, or Firm* — Innovation Counsel LLP

(57) ABSTRACT

Provided is a display device. The display device includes: a plurality of gate lines extending in a first direction; a plurality of data lines extending in a second direction that intersects the first direction; and a plurality of pixels connected to the gate lines and the data lines, wherein the pixels include pixels h-th row pixels (h is a natural number) and (h+1)-th row pixels, which are adjacent to each other in the second direction, with a (k+1)-th gate line (k is a natural number) therebetween among the gate lines; and a first pixel displaying a first color and connected to the (k+1)-th gate line among the h-th row pixels and a second pixel displaying the first color and connected to the (k+1)-th gate line among the (h+1)-th row pixels are spaced apart from each other in the first direction and receive different polarities of data voltages.

32 Claims, 26 Drawing Sheets

(56) References Cited

U.S. PATENT DOCUMENTS

| | | | |
|---|---|---|---|
| 2012/0169688 A1* | 7/2012 | Chen | H04N 13/0404 345/209 |
| 2015/0002376 A1* | 1/2015 | Yang | G09G 3/2003 345/58 |
| 2015/0187293 A1* | 7/2015 | Yoo | G09G 3/3607 345/694 |

FOREIGN PATENT DOCUMENTS

| KR | 10-2013-0067443 | 6/2013 |
|---|---|---|
| KR | 10-2013-0076864 | 7/2013 |
| KR | 10-2014-0006490 | 1/2014 |
| KR | 10-20150069411 | 6/2015 |

* cited by examiner

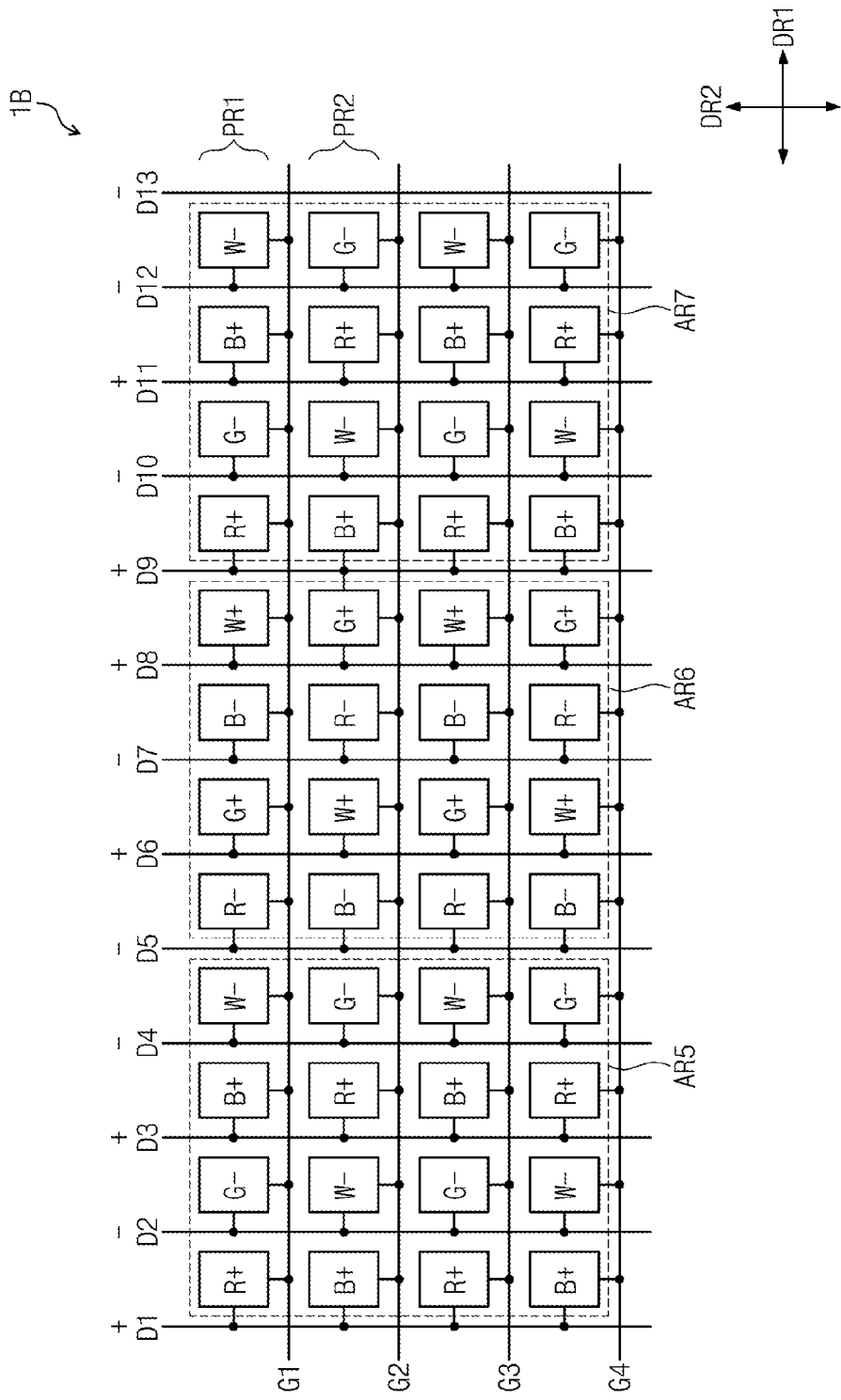

DISPLAY DEVICE AND METHOD OF DRIVING THE SAME

CROSS-REFERENCE TO RELATED APPLICATIONS

This U.S. non-provisional patent application claims priority under 35 U.S.C. §119 of Korean Patent Application No. 10-2014-0067090, filed on Jun. 2, 2014, the entire contents of which are hereby incorporated by reference.

BACKGROUND

The present disclosure relates to a display device and a driving method thereof, and more particularly, to a liquid crystal display device that applies an inversion driving method.

A liquid display device generally displays an image by adjusting the transmittance of incident light through its liquid crystal layer, which may be disposed between two substrates. The transmittance of the liquid crystal layer be controlled by forming an electric field in the liquid crystal layer. That is, by varying the strength of the electric field, the liquid display device is able to change the arrangement, orientation, and/or position of the liquid crystal molecules in the liquid crystal layer, and thereby cause different intensities of light to be displayed.

Methods for driving a liquid crystal display device may include line inversion, column inversion, and dot inversion, each of which involves applying a phase of a data voltage to a data line. The line inversion method inverts and applies a phase of image data to a data line by each pixel row. The column inversion method inverts and applies a phase of image data to a data line by each pixel column. The dot inversion method inverts and applies a phase of image data to a data line by each pixel row and each pixel column.

Moreover, in general, a display device is able to display a spectrum of colors, as perceived by a human eye, by transmitting different intensities of light in each of the three primary colors of red, blue, and green. That is, when the human eye perceives a mixture of primary-colored light that is transmitted simultaneously or sequentially over a very short period of time, the human eye perceives the light mixture as a single color light, and not the discrete, primary-colored light components. For example, the human eye may perceive a mixture of blue and green light as yellow light. Therefore, a display panel may include pixels that correspond to red, blue, and green, respectively.

Some display devices may include more than three colors of pixels. For example, a display device may include red pixels, blue pixels, green pixels, and pixels of another primary color, such as magenta, cyan, and yellow, or of other colors such as white. Moreover, in order to increase the brightness of a display image, a combination of red, blue, green, and white pixels may be used. Generally, red, blue, and green image signals provided from an external source are converted into red, blue, green, and white data signals, which are then provided to the display panel.

SUMMARY

The present disclosure provides a display device that improves a horizontal cross-talk phenomenon and a moving line stain phenomenon and a driving method thereof.

The present disclosure also provides a display device that prevents a user from seeing a flicker due to a brightness difference for each frame and a driving method thereof.

Embodiments of the present system and method provide display devices including: a plurality of gate lines extending in a first direction; a plurality of data lines extending in a second direction that intersects the first direction; and a plurality of pixels connected to the gate lines and the data lines, wherein the pixels include pixels h-th row pixels (h is a natural number) and (h+1)-th row pixels, which are adjacent to each other in the second direction, with a (k+1)-th gate line (k is a natural number) therebetween among the gate lines; and a first pixel displaying a first color and connected to the (k+1)-th gate line among the h-th row pixels and a second pixel displaying the first color and connected to the (k+1)-th gate line among the (h+1)-th row pixels are spaced apart from each other in the first direction and receive different polarities of data voltages.

In some embodiments, the first color may be one of red, green, blue, and white.

In other embodiments, the h-th row pixels may include a first pixel group and a second pixel group, which are sequentially arranged in the first direction; the (h+1)-th row pixels may include a third pixel group and a fourth pixel group, which are sequentially arranged in the first direction; and each of the first to fourth pixel groups may include an even number of pixels.

In still other embodiments, each of the first pixel group and the fourth pixel group may include two of a red pixel, a green pixel, a blue pixel, and a white pixel; and each of the second pixel group and the third pixel group may include two of the red pixel, the green pixel, the blue pixel, and the white pixel that are not in the first and fourth pixel groups.

In even other embodiments, when the first pixel is included in a (2u−1)-th pixel column (u is a natural number), the second pixel may be included in a (2u+1)-th pixel column; and when the first pixel is included in a 2u-th pixel column, the second pixel may be included in a (2u+2)-th pixel column.

In yet other embodiments, two pixels in a (2u−1)-th (u is a natural number) pixel column that are adjacent to each other in the second direction with a 2k-th gate line therebetween may be connected to each other by sharing the 2k-th gate line; and two pixels in a 2u-th pixel column that are adjacent to each other in the second direction with a (2k−1)-th gate line therebetween may be connected to each other by sharing the (2k−1)-th gate line.

In further embodiments, two pixels in a (2u−1)-th (u is a natural number) pixel column that are adjacent to each other in the second direction with a (2k−1)-th gate line therebetween may be connected to each other by sharing the (2k−1)-th gate line; and two pixels in a 2u-th pixel column that are adjacent to each other in the second direction with a 2k-th gate line therebetween may be connected to each other by sharing the 2k-th gate line.

In still further embodiments, u-th column pixels (u is a natural number) disposed between a j-th data line (j is a natural number) and a (j+1)-th data line among the data lines may be alternately connected to the j-th data line and the (j+1)-th data line every one pixel unit.

In even further embodiments, a polarity of a data voltage applied to the data lines may be inverted every one data line unit.

In yet further embodiments, a polarity of a data voltage that is applied to the data lines may be inverted between adjacent data lines.

In yet further embodiments, a polarity of a data voltage applied to the data lines may be inverted every two data lines.

In yet further embodiments, a number of pixels receiving a positive data voltage during an i-th frame (i is a natural number) and having a first connection structure may be equal to a number of pixels receiving a negative data voltage during the i-th frame and having the first connection structure.

In other embodiments of the present system and method, provided are methods of driving a display device. The methods include: applying a gate signal to a (k+1)-th gate line (k is a natural number) during a first horizontal period; applying a data voltage of a first polarity to a first pixel connected to the (k+1)-th gate line and displaying a first color in synchronization with the first horizontal period; and applying a data voltage of a second polarity different from the first polarity to a second pixel connected to the (k+1)-th gate line and displaying the first color in synchronization with the first horizontal period, wherein the first pixel and the second pixel are spaced apart from each other in a gate line extension direction and a data line extension direction.

BRIEF DESCRIPTION OF THE DRAWINGS

The accompanying drawings are included to provide a further understanding of the present system and method, and are incorporated in and constitute a part of this specification. The drawings illustrate exemplary embodiments of the present system and method and, together with the description, serve to explain principles of the present system and method. In the drawings:

FIG. 4B is a plan view that illustrates a portion of a liquid crystal panel according to a second comparative example;

Figure 1:
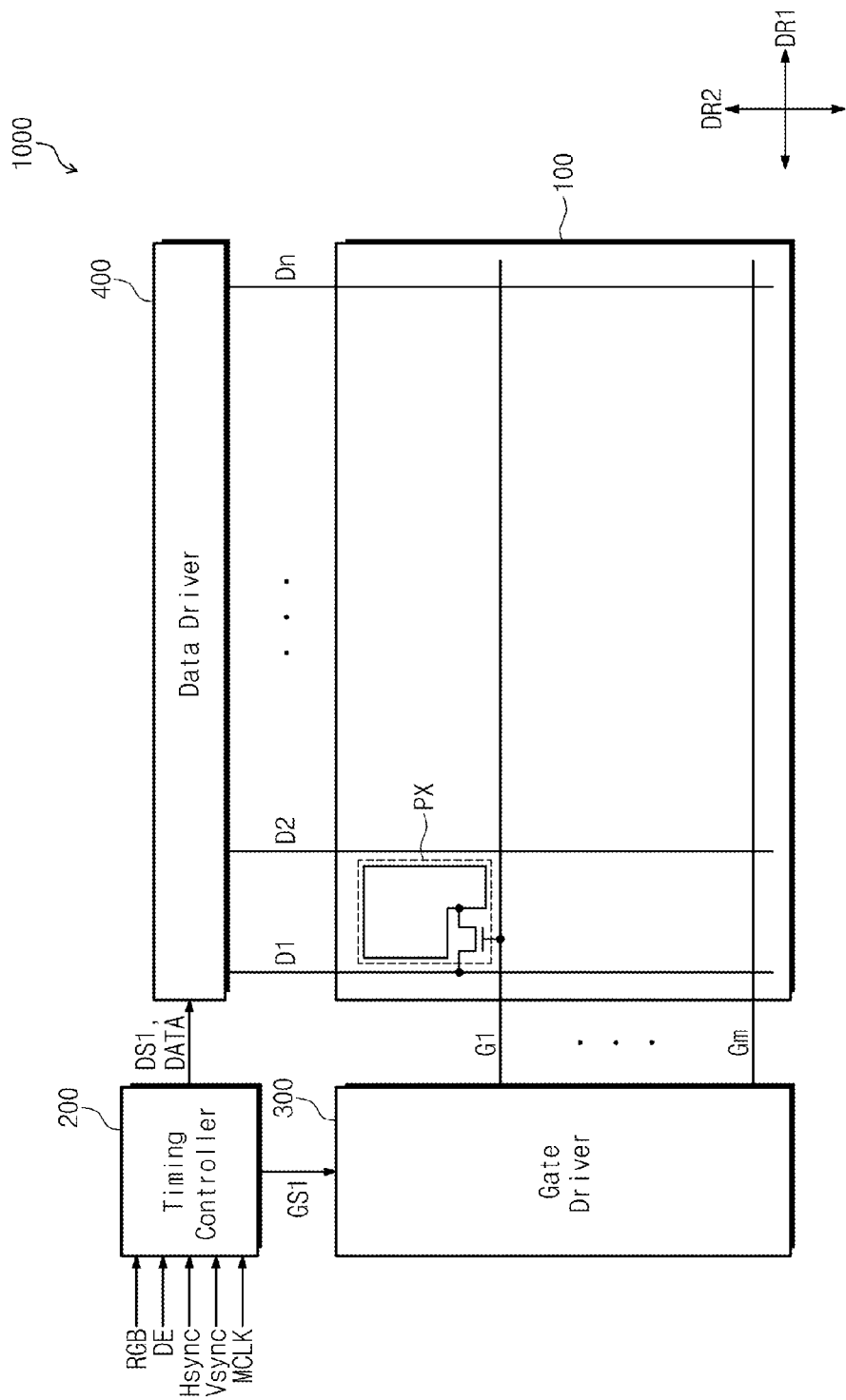
FIG. 1 is a block diagram that illustrates a liquid crystal display device according to an embodiment of the present system and method.

The figures in the drawings are not necessarily drawn to scale and are only intended to facilitate the description of the various embodiments described herein. The figures do not describe every aspect of the teachings disclosed herein and do not limit the scope of the claims.

DETAILED DESCRIPTION OF THE EMBODIMENTS

Various modifications are possible in various embodiments of the present system and method. Specific embodiments are illustrated in the drawings and related detailed descriptions are listed. The present system and method, however, are not limited to the specific embodiments disclosed herein. Those of ordinary skill in the art would understand that the present disclosure includes various modifications, equivalents, and substitutes not expressly disclosed.

Figure 2:
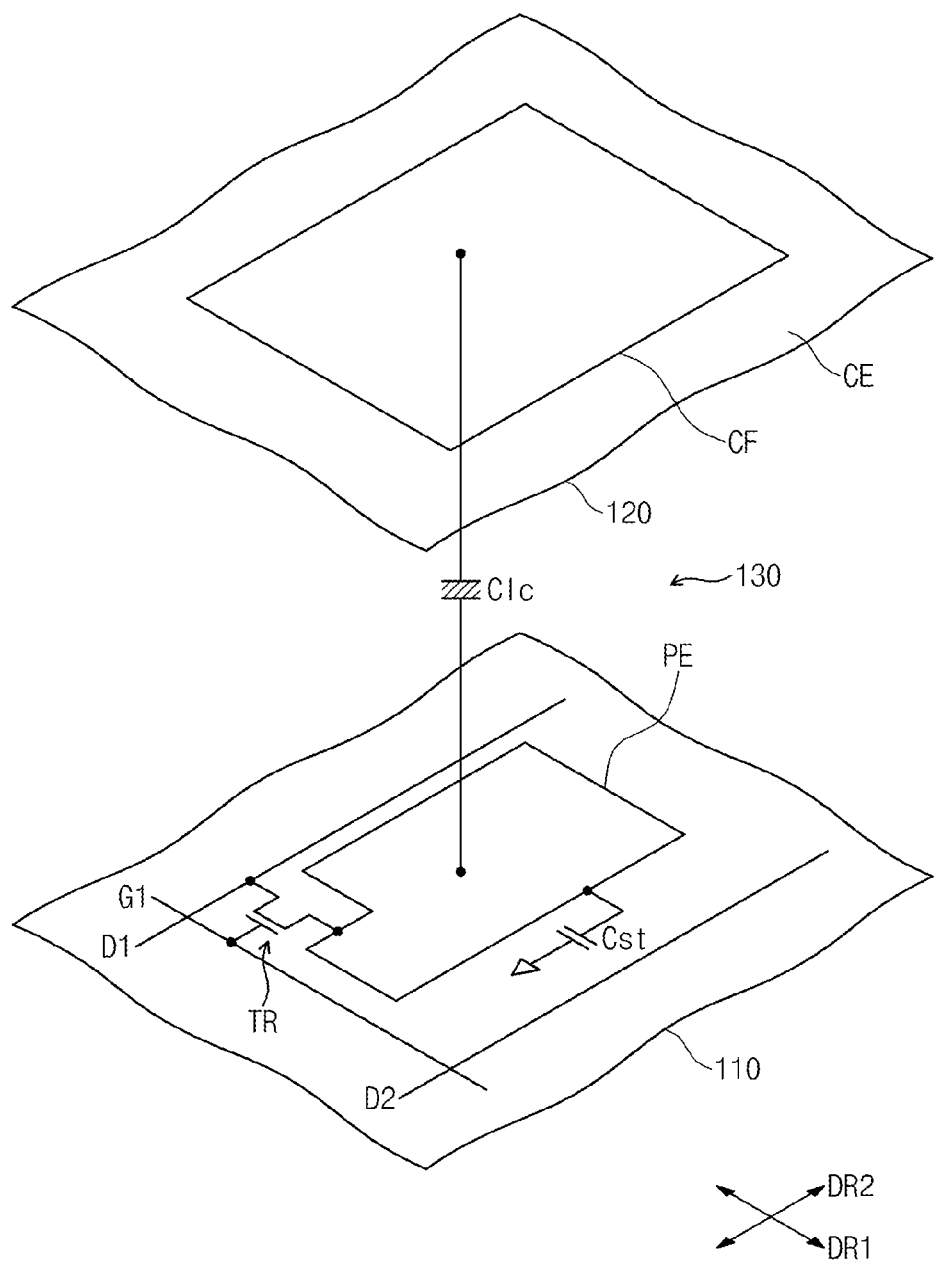
FIG. 2 is a circuit diagram that illustrates one pixel of the liquid crystal panel of FIG. 1.

FIG. 1 is a schematic block diagram of a liquid crystal display device according to an embodiment of the present system and method. FIG. 2 is a circuit diagram of one pixel in the liquid crystal panel shown in FIG. 1.

As shown in FIG. 1, the liquid crystal display device 1000 includes a liquid crystal panel 100, a timing controller 200, a gate driver 300, and a data driver 400. As shown in FIG. 2, the liquid crystal panel 100 includes a lower substrate 110, an upper substrate 120 facing the lower substrate 110, and a liquid crystal layer 130 disposed between the two substrates 110 and 120.

The liquid crystal panel 100 includes a plurality of gate lines G1 to Gm that extend in a first direction DR1 and a plurality of data lines D1 to Dn that extend in a second direction DR2. The second direction DR2 intersects the first direction DR1. The gate lines G1 to Gm and the data lines D1 to Dn define pixel areas and each of the pixel areas includes a pixel PX for displaying an image. A pixel PX connected to the first gate line G1 and the first data line D1 is exemplarily shown in FIG. 2.

The pixel PX may include a thin film transistor TR connected to the gate lines G1 to Gm, a liquid crystal capacitor Clc connected to the thin film transistor TR, and a storage capacitor Cst connected in parallel to the liquid capacitor Clc. The storage capacitor Cst may be omitted in some cases. The thin film transistor TR may be formed on the lower substrate 110. The thin film transistor TR includes a gate electrode that may be connected to the first gate line G1, a source electrode that may be connected to the first data line D1 and a drain electrode that may be connected to the liquid crystal capacitor Clc and the storage capacitor Cst.

As FIG. 2 illustrates, the liquid crystal capacitor Clc is formed from the pixel electrode PX on the lower substrate 110 and the common electrode CE on the upper substrate 120, which function as two terminals, and the liquid crystal layer 130 disposed between the two electrodes PE and CE, which functions as a dielectric. The pixel electrode PE is connected to the thin film transistor TR and the common electrode CE is formed on the upper substrate 120 and receives a common voltage. According to an embodiment that is different from that shown in FIG. 2, the common electrode CE may be provided on the lower substrate 110, in which case, one of the two electrodes PE and CE may include a slit.

The storage capacitor Cst may serve as an auxiliary role to the liquid crystal capacitor Clc and may include the pixel electrode PE, a storage line (not shown), and an insulator disposed between the pixel electrode PE and the storage line (not shown). The storage line (not shown) may be provided on the lower substrate 110 and may overlap a portion of the pixel electrode PE. A predetermined voltage such as a storage voltage is applied to the storage line (not shown).

The pixel PX may display one of several primary colors, such as red, green, blue, and white. However, the present system and method are not limited thereto. For example, the primary colors may further include yellow, cyan, and magenta. The pixel PX may further include a color filter CF that transmits light of only a corresponding one of the primary colors. Although the color filter CF is provided on the upper substrate 120 as shown in FIG. 2, the present system and method are not limited thereto and thus the color filter CF may be provided on the lower substrate 110.

The timing controller 200 receives image data RGB and a control signal from an external graphic control unit (not shown). The control signal may include a vertical sync signal (hereinafter referred to as a "Vsync signal"), that is, a frame-differencing signal, a horizontal sync signal (hereinafter referred to as a "Hsync signal"), that is, a row-differencing signal, an enable signal (hereinafter referred to as a "DE signal") that is maintained at a high level during an interval when data is outputted for displaying a zone where data enters, and a main clock signal MCLK.

The timing controller 200 may convert the image data RGB to match the specification of the data driver 400 and may then output the converted image data signal DATA to the data driver 400. The timing controller 200 generates a gate control signal G1 and a data control signal DS1. The timing controller 200 outputs the gate control signal GS1 to the gate driver 300 and outputs the data control signal DS1 to the data driver 400. The gate control signal GS1 is a signal for driving the gate driver 300 and the data control signal DS1 is a signal for driving the data driver 400.

The data driver 300 generates a gate signal on the basis of the gate control signal GS1 and outputs the gate signal to the gate lines G1 to Gm. The gate control signal GS1 may include a scanning start signal that indicates scanning start, at least one clock signal that controls an output period of the gate-on voltage, and an output enable signal that limits a duration time of the gate-on voltage.

The data driver 400 generates a gradation voltage according to the image data on the basis of the data control signal DS1 and then outputs the generated gradation voltage to the data lines D1 to Dn as a data voltage. The data voltage may include a positive data voltage that has a positive value and a negative data voltage that has a negative value, with respect to common voltage. The data control signal DS1 may include a horizontal start signal STH for notifying the start of transmitting image data DATA to the data driver 400, a load signal for applying data voltage to the data lines D1 to Dn, and an invert signal for inverting the polarity of data voltage with respect to common voltage.

The polarity of a data voltage that is applied to the pixel PX may be inverted after the end of one frame and before the start of next frame to prevent the deterioration of the liquid crystal. That is, in response to an invert signal that is applied to the data driver 400, the polarity of the data voltage may be inverted by one frame unit. The liquid crystal panel 100 may be driven using a method that applies data voltages of different polarities at least every one data line unit, which improves picture quality when an image of one frame is displayed.

Each of the timing controller 200, the gate driver 300, and the data driver 400 may be directly mounted on the liquid crystal panel 100 as one or more integrated circuit chips, on a flexible printed circuit board to be attached to the liquid crystal panel 100 in a form of tape carrier package (TCP), or on an additional printed circuit board. In some embodiments, at least one of the gate driver 300 and the data driver 400 may be integrated on the liquid crystal panel 100 along with the gate lines G1 to Gm, the data lines D1 to Dn, and the thin film transistor TR. Additionally, the timing controller 200, the gate driver 300, and the data driver 400 may be integrated as a single chip.

Figure 3:
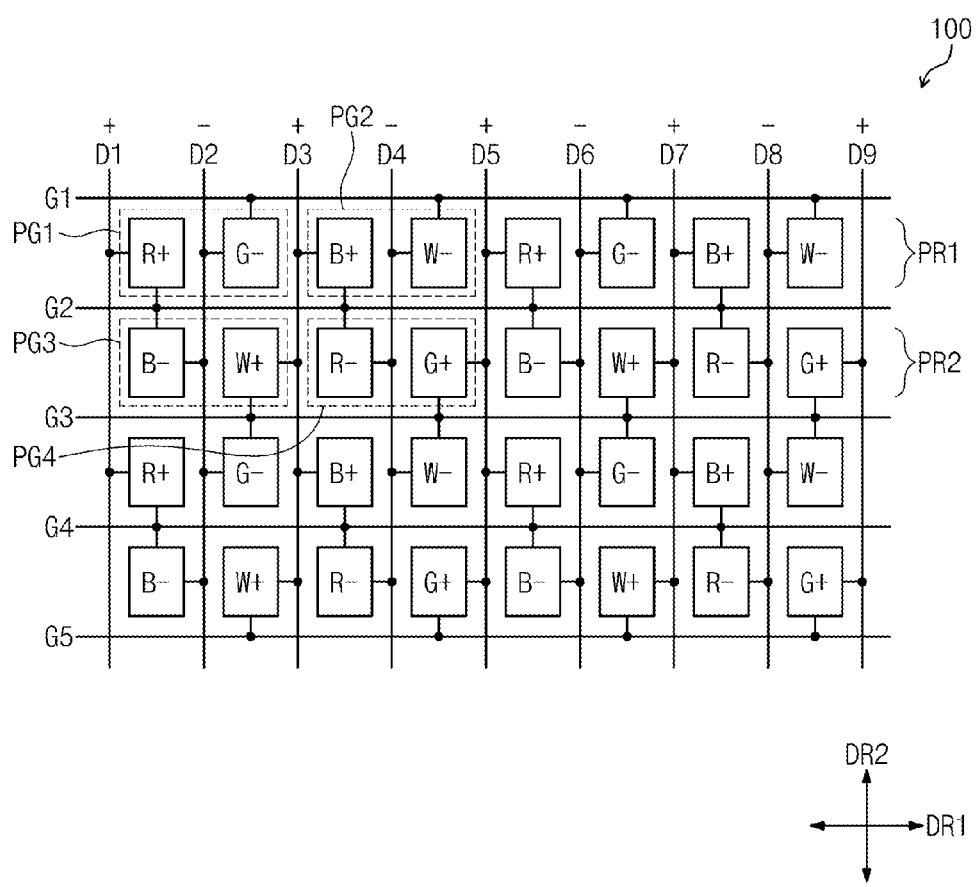
FIG. 3 is a plan view that illustrates a portion of a liquid crystal panel according to an embodiment of the present system and method.

FIG. 3 is a plan view that illustrates a portion of a liquid crystal panel according to an embodiment of the present system and method. Referring to FIG. 3, the pixels include pixels of an h-th (h is a natural number) row (hereinafter referred to as a first pixel row) and pixels of an (h+1)-th row (hereinafter referred to as a second pixel row). The first pixel row PR1 and the second pixel row PR2 are adjacent to each other in the second direction DR2, with a (k+1)-th (k is a natural number) gate line therebetween among the gate lines G1 to Gm. Hereinafter, the case in which k and h are equal to 1 is described with reference to FIG. 3.

The first pixel row PR1 includes a first pixel group PG1 and a second pixel group PG2, which are sequentially arranged in the first direction DR1. The second pixel row PR2 includes a third pixel group PG3 and a fourth pixel group PG4, which are sequentially arranged in the first direction DR1. Each of the first to fourth pixel groups PG1 to PG4 includes an even number of pixels. For an example, each of the first to fourth pixel groups PG1 to PG4 shown in FIG. 3 includes two pixels.

Each of the first to fourth pixel groups PG1 to PG4 may display two of the primary colors. For example, each of the first pixel group PG1 and the fourth pixel group PG4 includes a red pixel and a green pixel. Each of the second pixel group PG2 and the third pixel group PG3 includes a blue pixel and a white pixel. The first to fourth pixel groups PG1 to PG4 may be arranged repeatedly.

As shown in FIG. 3, a red pixel, a green pixel, a blue pixel, and a white pixel are denoted by R, G, B, and W, respectively. Additionally, pixels receiving a positive (+) data voltage during an i-th (i is a natural number) frame are denoted by R+, G+, B+, and W+ and pixels receiving a negative (−) data voltage during an i-th frame are denoted by R−, G−, B−, and W−.

The polarity of a data voltage provided to each pixel of the liquid crystal panel shown in FIG. 3 represents the polarity of the i-th frame and is inverted during an (i+1)-th frame. That is, the data driver 400 of FIG. 1 inverts the polarities of the data voltages that are outputted to the data lines D1 to Dn for each frame.

Moreover, the arrangement and ordering of the pixels are not limited to the case shown in FIG. 3 and thus may vary. That is, the positions of red, green, blue, and white pixels may vary in each of the first pixel row PR1 and the second pixel row PR2. For example, in one embodiment, each of the first pixel group PG1 and the fourth pixel group PG4 may include a red pixel and a blue pixel and each of the second pixel group PG2 and the third pixel group PG3 may include a green pixel and a white pixel. In another embodiment, each of the first pixel group PG1 and the fourth pixel group PG4 may include a red pixel and a white pixel and each of the second pixel group PG2 and the third pixel group PG3 may include a green pixel and a blue pixel.

According to an embodiment of the present system and method, the polarities of the data voltage that are applied to the data lines D1 to D9 may be inverted between adjacent data lines. For example, as FIG. 3 illustrates, a positive data voltage may be applied to odd-numbered data lines D1, D3, D5, D7, and D9 while a negative data voltage may applied to even-numbered data lines D2, D4, D6, and D8.

According to an embodiment of the present system and method, adjacent pixels of a u-th (u is a natural number) column between a j-th (j is a natural number) data line and a (j+1)-th data line may be alternately connected to the j-th data line and the (j+1)-th data line. Hereinafter, the case in which j and u are equal to 1 is described with reference to FIG. 3.

Adjacent pixels of the first column disposed between the first data line D1 and the second data line D2 may be alternately connected to the first data line D1 and the second data line D2. That is, pixels constituting one column may be alternately connected to the left and right adjacent data lines from one row to the next. For example, the embodiment of FIG. 3 shows that the red pixel R+ of the first pixel group PG may be connected to the first data line D1 and the blue pixel B− of the third pixel group PG3 may be connected to the second data line D2.

According to an embodiment of the present system and method, two pixels adjacent to each other in the second direction DR2 of the (2u−1)-th (u is a natural number) pixel column with a 2k-th gate line therebetween are connected to each other by sharing the 2k-th gate line. Additionally, two pixels adjacent to each other in the second direction DR2 of the 2u-th pixel column with a (2k−1)-th gate line therebetween are connected to each other by sharing the (2k−v1)-th gate line.

As FIG. 3 illustrates, the red pixel R+ in the first pixel group PG1 and the blue pixel B− in the third pixel group PG3 are disposed in the first pixel column and adjacent to each other with the second gate line G2 positioned therebetween. The red pixel R+ and the blue pixel B− are connected to each other by sharing the second gate line G2. Accordingly, the red pixel R+ and the blue pixel B− of the first pixel column are driven by the same gate signal that is applied to the second gate line G2. Additionally, the red pixel R− and the blue pixel B+ of the third pixel column are also connected to the second gate line G2 and, therefore, driven by the same gate signal that is applied to the second gate line G2.

FIG. 3 further illustrates that the white pixel W+ and the green pixel G− are disposed in the second pixel column and adjacent to each other with the third gate line G3 positioned therebetween. The white pixel W+ and the green pixel G− are connected to each other by sharing the third gate line G3. Accordingly, the white pixel W+ and the green pixel G− of the second pixel column are driven by the same gate signal that is applied to the third gate line G3. Additionally, the white pixel W+ and the green pixel G− of the fourth pixel column are also connected to the third gate line G3 and, therefore, driven by the same gate signal that is applied to the third gate line G3.

However, the present system and method are not limited to the embodiment discussed above. According to another embodiment, two pixels adjacent to each other in the second direction DR2 of the (2u−1)-th pixel column with a (2k−1)-th gate line therebetween are connected to each other by sharing the (2k−1)-th gate line. Additionally, two pixels adjacent to each other in the second direction DR2 of the 2u-th pixel column with a 2k-th gate line therebetween are connected to each other by sharing the 2k-th gate line.

According to an embodiment of the present system and method, a first pixel in the h-th pixel row, which displays a first color and is connected to the k-th gate line, and a second pixel in the (h+1)-th pixel row, which also displays the first color and is connected to the k-th gate line, may receive data voltages of different polarities. The first pixel and the second pixel may be spaced apart from each other in the first direction DR1. The first pixel and the second pixel may be spaced apart from each other in the first direction DR1 with an odd number of pixel columns therebetween. The first color may be one of the primary colors, that is, one of red, green, blue, and white.

For example, FIG. 3 illustrates that when the first pixel is included in the first pixel group PG1, the second pixel may be included in the fourth pixel group PG4. Moreover, when the first pixel is included in the second pixel group PG2, the second pixel may be included in the third pixel group PG3. That is, when the first pixel is included in the (2u−1)-th pixel column, the second pixel may be included in the (2u+1)-th pixel column. Additionally, when the first pixel is included in the (2u−1)-th pixel column, the second pixel may be included in the (2u+2)-th pixel column.

FIG. 3 further illustrates that when the first color is red and each of the first and second pixels is a red pixel, the red pixel R+ of the first pixel row PR1 and the red pixel R− of the second pixel row PR2 are connected to the second gate line G2 but receive data voltages of different polarities from adjacent data lines D1 and D2.

Figure 4A:
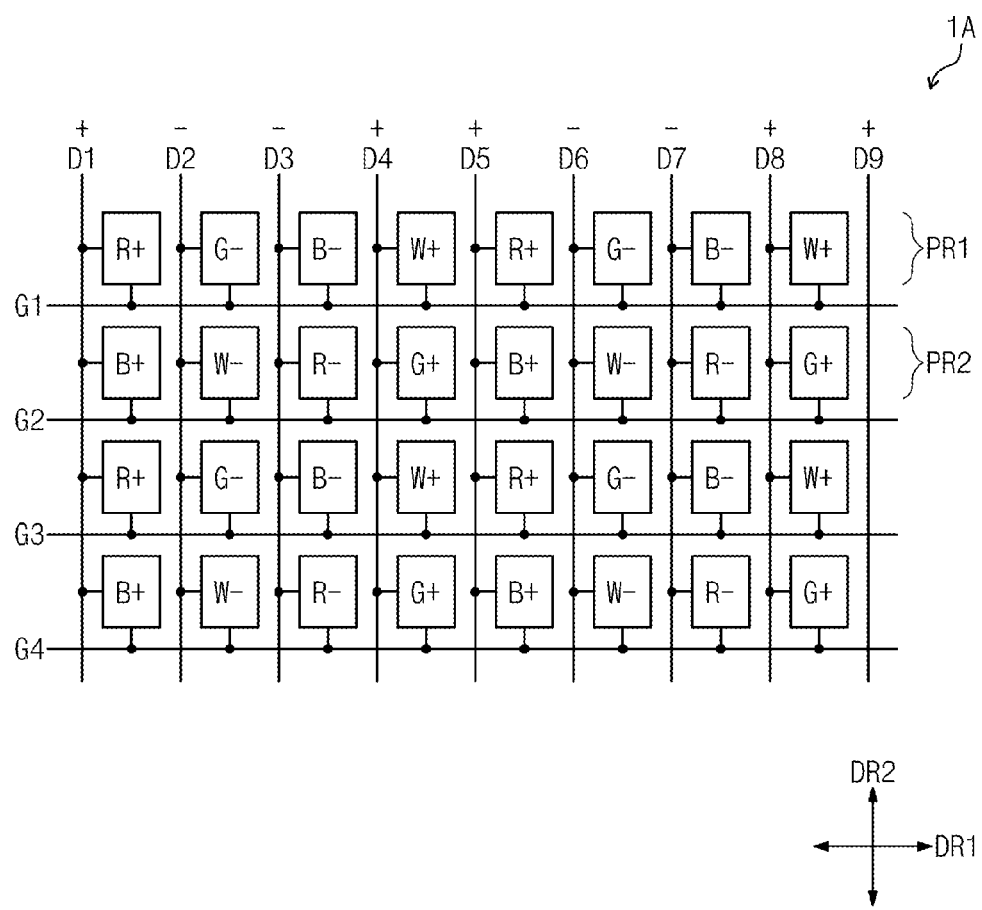
FIG. 4A is a plan view that illustrates a portion of a liquid crystal panel according to an embodiment of the present system and method.

FIG. 4A is a plan view that illustrates a portion of a liquid crystal panel according to a first comparative example. FIG. 4B is a plan view that illustrates a portion of a liquid crystal panel according to a second comparative example. Hereinafter, referring to FIGS. 4A and 4B, liquid crystal panels according to first and second comparative examples are described and an effect of a liquid crystal panel according to an embodiment of the present system and method shown in FIG. 3 is described.

Referring to FIGS. 4A and 4B, each of a first comparison liquid crystal panel 1A and a second comparison liquid crystal panel 1B may include a plurality of pixels. In odd-numbered row pixels, a red pixel, a green pixel, a blue pixel, and a white pixel are sequentially arranged and in even-numbered row pixels, a blue pixel, a white pixel, a red pixel, and a green pixel are sequentially arranged. Each of the pixels of the first comparison liquid crystal panel 1A and the second comparison liquid crystal panel 1B is connected to the gate line below it and the data line to the left of it.

The polarities of the data voltages that are applied to the data lines D1 to D9 of the first comparison liquid crystal panel 1A may be repeated in order of positive polarity, negative polarity, negative polarity, positive polarity, and so on. That is, the polarities of the data voltages that are applied to the data lines D1 to D9 of the first comparison liquid crystal panel 1A may be +−−++−−++, respectively.

The polarities of the data voltages that are applied to the data lines D1 to D9 of the second comparison liquid crystal panel 1B may be inverted for adjacent groups of four data lines and for adjacent data lines in each group (e.g, if a first group is +−+−, then an adjacent group is −+−+). That is, the polarities of the data voltages that are applied to the data lines D1 to D9 of the second comparison liquid crystal panel 1B may be +−+−−+−++, respectively. Further, the polarities of the data voltages that are applied to the pixels of the first comparison liquid crystal panel 1A and the second comparison liquid crystal panel 1B may be inverted from one frame to the next.

Figure 5:
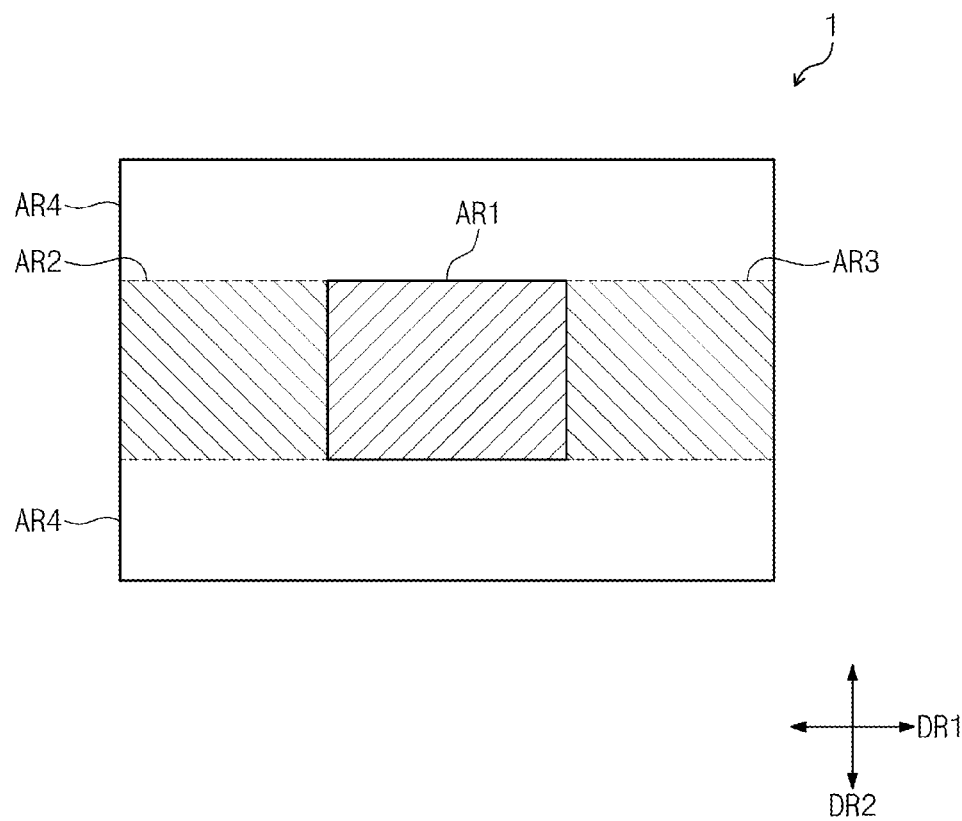
FIG. 5 is a schematic view that illustrates a liquid crystal panel where horizontal cross-talk occurs.

FIG. 5 is a schematic view that illustrates a liquid crystal panel in which horizontal cross-talk occurs. The liquid crystal panel 1 of FIG. 5 displays a primary color (e.g, red) in a first area AR1, as an example.

If the sum of the data voltage polarities that are applied to a primary-colored pixel during an interval 1H is biased to a positive polarity or a negative polarity, the common voltage may not be maintained uniformly due to a coupling phenomenon of the data lines and the common electrode. Additionally, a ripple in the common voltage may occur in a positive direction or a negative direction. These effects may translate to a horizontal cross-talk phenomenon in which a brightness difference in a second area AR2 and a third area AR3 is observed compared to a peripheral area AR4. The second area AR2 and third area AR3 are adjacent to the first area AR1 in the first direction DR1, which displays the primary colors of the liquid crystal panel 1 of FIG. 5.

For example, referring to FIG. 4A, the red pixels of the first comparison liquid crystal panel 1A are driven by positive or negative data voltages. Particularly, the red pixels R+ included in the first pixel row of the first comparison liquid crystal panel 1A receive positive data voltages when a gate signal is applied to the first gate line G1 during the first interval 1H. This may cause a ripple in the common voltage in a positive direction such that a horizontal cross-talk phenomenon may occur. Moreover, the red pixels R− included in the second pixel row receive negative data voltages when a gate signal is applied to the second gate line G2 during the next interval 1H. This may cause a ripple in the common voltage in a negative direction such that a horizontal cross-talk phenomenon may occur.

Referring to FIG. 4B, the red pixels of the second comparison liquid crystal panel 1B are driven by positive or negative data voltages. The second comparison liquid crystal panel 1B may display a red image in a fifth area AR5 and a sixth area AR6 during an i-th frame and a red image in a sixth area AR6 and a seventh area AR7 during an (i+1)-th frame. In such case, a brightness difference between a red pixel to which positive data voltage is applied and a red pixel to which negative data voltage is applied may be observed as a vertical line that moves from the i-th frame to the (i+1)-th frame. This phenomenon in which an observed vertical line moves is referred to as a moving line stain. The moving line stain may be an issue when a specific color is represented and also when all pixels are driven for white color.

The horizontal cross-talk in the first comparison panel 1A of FIG. 4A and the moving line stain in the second comparison liquid crystal panel 1B of FIG. 4B are regarded as defects. In contrast, the liquid crystal panel 100 of FIG. 3 prevents or otherwise reduces the occurrences of these defects.

Referring to FIG. 3 again, the red pixels R+ included in the first pixel row of the liquid crystal panel 100 and the red pixels R− included in the second pixel row of the liquid crystal panel 100 are driven by a gate signal that is applied to the second gate line G2 during an interval 1H. The first data line D1 and the fifth data line D5 are connected to the first row red pixels R+ to provide positive data voltages. The fourth data line D4 and the eighth data line D8 are connected to the second row red pixels R− to provide negative data voltages. Because the sum of the data voltage polarities that are applied during an interval 1H for displaying the red color is unbiased, a ripple is not formed in the common voltage and occurrences of horizontal cross-talk are prevented or otherwise reduced. Furthermore, since the pixels included in one pixel row receive the same data voltage polarity, occurrences of moving line stains are also prevented or otherwise reduced. Thus, according to an embodiment of the present system and method, such as that shown in FIG. 3, occurrences of horizontal cross-talk and moving line stains may be simultaneously prevented or otherwise reduced.

FIGS. 6 to 17 are plan views of a liquid crystal panel according to various embodiments of the present system and method. The various embodiments described below may contain one or more parts that are the same or similar to those described above in connection with the liquid crystal panel of FIG. 3. Such parts may not be expressly described below in the interest of brevity.

In embodiments described below, the data voltage polarities may be inverted for adjacent groups of two data lines (e.g., if a first group is ++, then an adjacent group is −−. Referring to FIGS. 6 to 16, as an example, the data voltage polarities that are applied to the data lines D1 to D8 are in the order of ++−−++−−.

The liquid crystal panels 100A to 100D shown in FIGS. 6 to 10 differ from the liquid crystal panel of FIG. 3 at least in that pixels constituting one column have a 2-dot staggered connection structure in an adjacent data line. That is, referring to FIGS. 6 to 10, pixels of a u-th (u is a natural number) column between a j-th (j is a natural number) data line and a (j+1)-th data line may be alternately connected to the j-th data line and the (j+1)-th every two pixels. Hereinafter, the case in which j and u are equal to 1 is described with reference to FIGS. 6 to 10.

Figure 6:
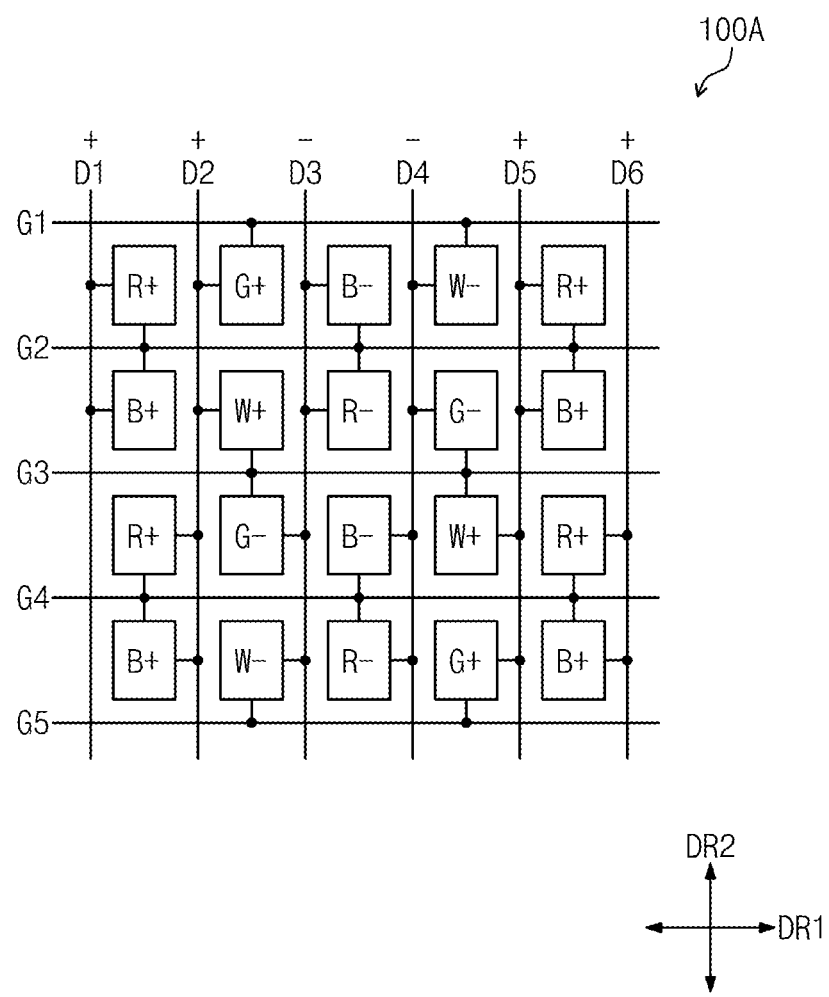
FIGS. 6, 7, 8, 9, 10, 11, 12, 13, 14, 15, 16, and 17 are plan views of a liquid crystal panel according to various embodiments of the present system and method.

Pixels of the first column disposed between the first data line D1 and the second data line D2 may be alternately connected to the first data line D1 and the second data line D2 every two pixel units. That is, pixels constituting one column may be alternately connected to the left and right adjacent data lines every two row units. For example, FIG. 6 illustrates that, in the first pixel column, the first row red pixel R+ is connected to the first data line D1, the second row blue pixel B+ is connected to the first data line D1, the third row red pixel R+ is connected to the second data line D2, and the fourth row blue pixel B+ is connected to the second data line D2. The liquid crystal panel 100A according to the embodiment of FIG. 6 may improve a horizontal cross-talk and a moving vertical line.

Figure 7:
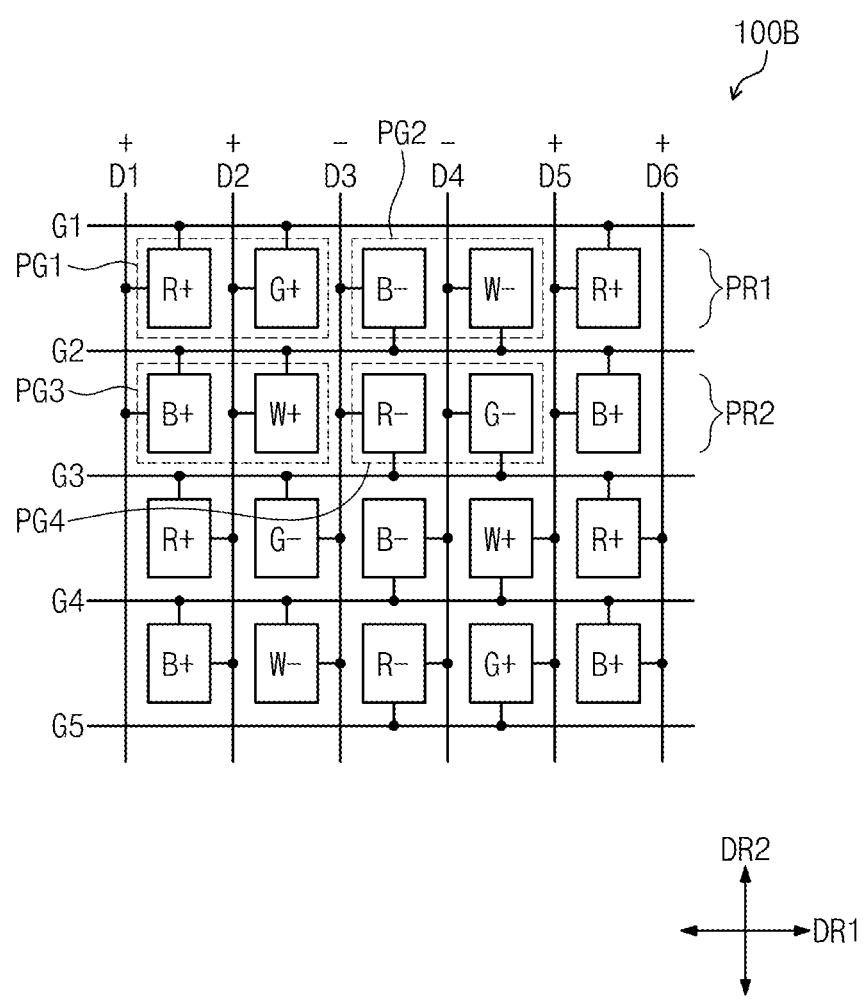
Figure 8:
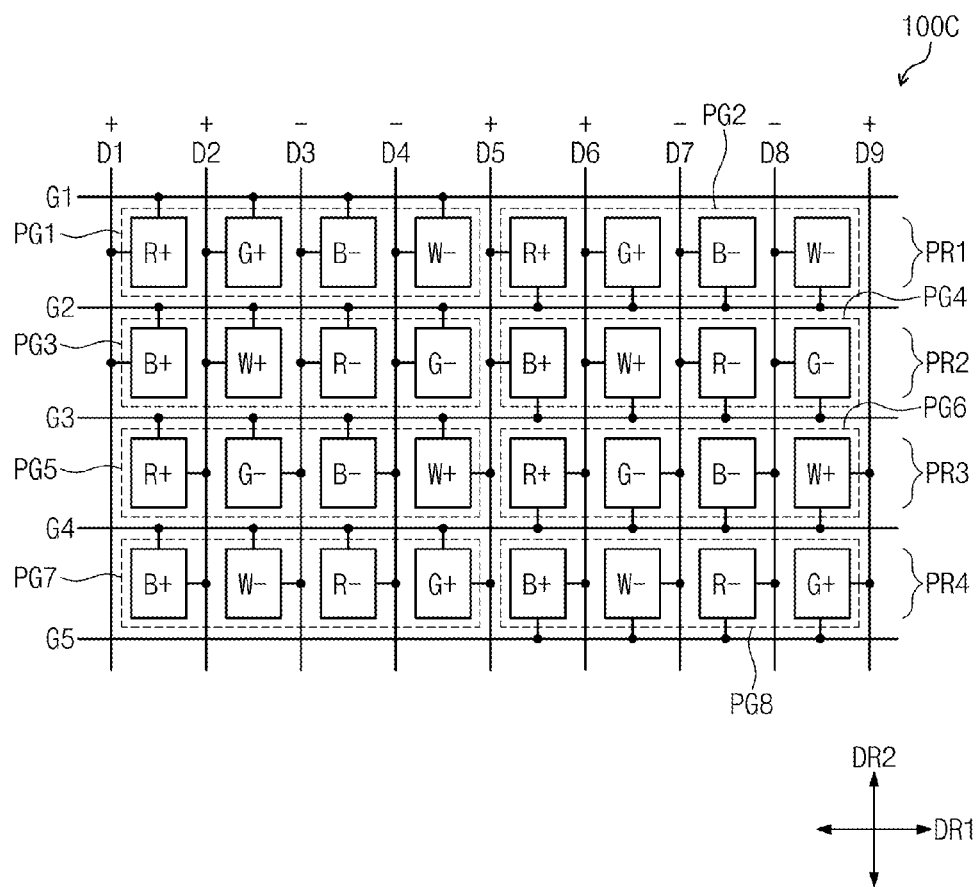
Figure 9:
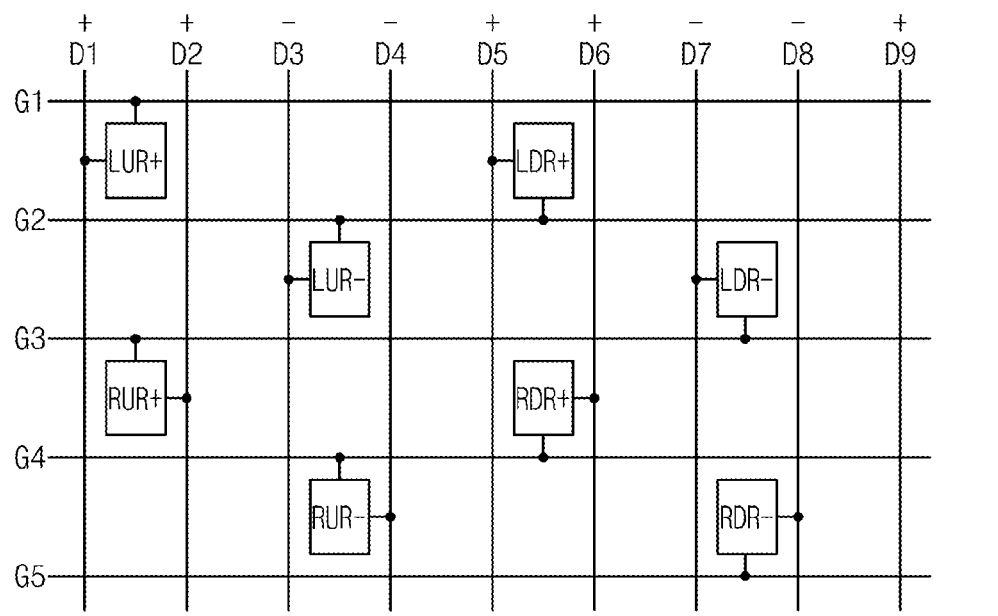
Figure 9:
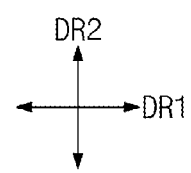

The liquid crystal panels 100B to 100D shown in FIGS. 7 to 9 differ from the liquid crystal panel of FIG. 3 at least in that every two or more pixels in one row may alternately connect to adjacent gate lines. That is, referring to FIGS. 7 to 9, the h-th row pixels that are disposed between a k-th gate line and a (k+1)-th gate line may be alternately connected to the k-th gate line and the (k+1)-th gate line at least every one pixel units (e.g., every two pixel units shown in FIG. 7 and every four pixel units shown in FIG. 8).

Referring to FIG. 7, the h-th row pixels disposed between a k-th gate line and a (k+1)-th gate line of the liquid crystal panel 100B may be alternately connected to the k-th gate line and the (k+1)-th gate line every two pixel units. As shown in FIG. 7, when k and h are equal to 1, the red pixel R+ and the green pixel G+ among the first row pixels are connected to the first gate line G1 and the blue pixel B− and the white pixel W− are connected to the second gate line G2.

Referring to FIG. 7, the pixels include pixels of an h-th (h is a natural number) row (hereinafter referred to as a first pixel row) and pixels of an (h+1)-th row (hereinafter referred to as a second pixel row). The first and second pixel rows are adjacent to each other in the second direction DR2 with a (k+1)-th (k is a natural number) gate line therebetween. Hereinafter, the case that k and h are equal to 1 is described with reference to FIG. 7.

The first pixel row PR1 includes a first pixel group PG1 and a second pixel group PG2, which are sequentially arranged in the first direction DR1. The second pixel row PR2 includes a third pixel group PG3 and a fourth pixel group PG4, which are sequentially arranged in the first direction DR1. Each of the first to fourth pixel groups PG1 to PG4 includes an even number of pixels. As shown in FIG. 7, as an example, each of the first to fourth pixel groups PG1 to PG4 includes two pixels.

FIG. 7 illustrates that pixels included in each of the first pixel group PG1 and the third pixel group PG3 may be connected to upper adjacent gate lines (G1 and G2, respectively) and pixels included in each of the second pixel group PG2 and the fourth pixel group PG4 may be connected to lower adjacent gate lines (G2 and G3, respectively). In another embodiment (not shown), pixels included in each of the first pixel group PG1 and the third pixel group PG3 may be connected to lower adjacent gate lines (e.g., G2 and G3, respectively) and pixels included in each of the second pixel group PG2 and the fourth pixel group PG4 may be connected to upper adjacent gate lines (e.g., G1 and G2, respectively). Similar to that of FIG. 3, the liquid crystal panel 100B according to the embodiment of FIG. 7 may prevent or otherwise reduce occurrences of horizontal crosstalk and moving line stains.

Referring to FIG. 8, the h-th row pixels disposed between a k-th gate line and a (k+1)-th gate line of the liquid crystal panel 100C may be alternately connected to the k-th gate line and the (k+1)-th gate every four pixel units. As shown in FIG. 8, when k and h are equal to 1, the first four pixels among the first row pixels may be connected to the first gate line G1 and the next four pixels may be connected to the second gate line G2.

Referring to FIG. 8, the pixels include pixels of an h-th (h is a natural number) row (hereinafter referred to as a first pixel row), pixels of an (h+1)-th row (hereinafter referred to as a second pixel row), pixels of an (h+2)-th row (hereinafter referred to as a third pixel row), and pixels of an (h+3)-th row (hereinafter referred to as a fourth pixel row). Hereinafter, the case in which k and h are 1's is described with reference to FIG. 8.

The first pixel row PR1 includes a first pixel group PG1 and a second pixel group PG2, which are sequentially arranged in the first direction DR1. The second pixel row PR2 includes a third pixel group PG3 and a fourth pixel group PG4, which are sequentially arranged in the first direction DR1. The third pixel row PR3 includes a fifth pixel group PG5 and a sixth pixel group PG6, which are sequentially arranged in the first direction DR1. The fourth pixel row PR4 includes a seventh pixel group PG7 and an eighth pixel group PG8, which are sequentially arranged in the first direction DR1.

Each of the first to eighth pixel groups PG1 to PG8 includes an even number of pixels. As shown in FIG. 8, as an example, each of the first to eighth pixel groups PG1 to PG8 includes four pixels, a red pixel, a green pixel, a blue pixel, and a white pixel.

FIG. 8 illustrates that pixels included in each of the first pixel group PG1, the third pixel group PG3, the fifth pixel group PG5, and the seventh pixel group G7 may be connected to upper adjacent gate line (G1, G2, G3, and G4, respectively) and pixels included in each of the second pixel group PG2, the fourth pixel group PG4, the sixth pixel group PG6, and the eighth pixel group PG8 may be connected to lower adjacent gate lines (G2, G3, G4, and G5, respectively). In another embodiment (not shown), pixels included in each of the first pixel group PG1, the third pixel group PG3, the fifth pixel group PG5, and the seventh pixel group G7 may be connected to lower adjacent gate lines (e.g., G2, G3, G4, and G5, respectively) and pixels included in each of the second pixel group PG2, the fourth pixel group PG4, the sixth pixel group PG6, and the eighth pixel group PG8 may be connected to upper adjacent gate lines (e.g., G1, G2, G3, and G4).

The number of pixels that receive a positive data voltage during an i-th frame and have a first connection structure may be equal to the number of pixels that receive a negative data voltage during the i-th frame and have the first connection structure. As used herein, a connection structure refers to a configuration in which a pixel is connected to one gate line among adjacent gate lines and is connected to one data line among adjacent data lines.

Among the pixels that receive a positive data voltage during an i-th frame, the number of pixels that are connected to an upper gate line may be equal to the number of pixels that are connected to a lower gate line, and the number of pixels that are connected to a left data line may be equal to the number of pixels that are connected to a right data line. Among the pixels that receive a negative data voltage during an i-th frame, the number of pixels that are connected to an upper gate line may be equal to the number of pixels that are connected to a lower gate line, and the number of pixels that are connected to a left data line may be equal to the number of pixels that are connected to a right data line.

FIG. 9 is a view that illustrates the red pixels in the liquid crystal panel of FIG. 8. Referring to FIGS. 8 and 9, the red pixels included in each of the first to eighth pixel group PG1 to PG8 are described together in one example. For the purposes of discussion below, a pixel may be classified as a left-top pixel, a right-top pixel, a left-bottom pixel, be a right-bottom pixel. That is, the pixel may display a color and be provided in an area defined by a k-th gate line, a (k+1)-th gate line, a j-th data line, and a (j+1)-th data line. The left-top pixel may be connected to a j-th data line and a k-th gate line. The right-top pixel may be connected to a (j+1)-th data line and a k-th gate line. The left-bottom pixel may be connected to a j-th data line and a (k+1)-th gate line. The right-bottom pixel may be connected to a (j+1)-th data line and a (k+1)-th gate line.

As shown in FIG. 9, the first pixel group PG1 includes a left-top red pixel LUR+ that receives a positive data voltage. The second pixel group PG2 includes a left-bottom red pixel LDR+ that receives a positive data voltage. The third pixel group PG3 includes a left-top red pixel LUR− that receives a negative data voltage. The fourth pixel group PG4 includes a left-bottom red pixel LDR− that receives a negative data voltage. The fifth pixel group PG5 includes a right-top red pixel RUR+ that receives a positive data voltage. The sixth pixel group PG6 includes a right-bottom red pixel RDR+ that receives a positive data voltage. The seventh pixel group PG7 includes a right-top red pixel RUR− that receives a negative data voltage. The eighth pixel group PG8 includes a right-bottom red pixel RDR− that receives a negative data voltage.

Each of the left-top red pixels LUR+ and LUR−, the right-top red pixels RUR+ and RUR−, the left-bottom red pixels LDR+ and LDR−, and the left-top red pixels LUR+ and LUR− includes one red pixel that receives a positive data voltage and one red pixel that receives a negative data voltage.

Two pixels that have different connection positions to a gate line and a data line may include different forms of thin film transistors. The different forms of thin film transistors may have different parasitic capacitances due to errors in the manufacturing processes. Thus, two pixels that have different gate line and data line connection structures may exhibit different brightness levels even when the same data voltage is applied. For example, as shown in FIG. 9, even if a left-top red pixel LUR+, a right-top red pixel RUR+, a left-bottom red pixel LDR+, and a left-top red pixel LUR+ receive the same data voltage during an i-th frame, may have different brightness levels due to errors in the manufacturing processes.

When the data line voltage polarities are inverted from one frame to the next, flickering may be observed due to brightness differences if the pixels that receive positive data voltages during an i-th frame have different gate line and data line connection structures from those pixels that receive negative data voltages during the i-th frame. However, because the embodiment of FIG. 8 uses the same data line and gate line connection structure for pixels that receive a positive data voltage have during an i-th frame and for pixels that receive a negative data voltage have during the i-th frame, flicker may not be observed because there is no brightness difference at each frame. Furthermore, similar to that of FIG. 3, the liquid crystal panel 100C according to the embodiment of FIG. 8 may prevent or otherwise reduce occurrences of horizontal cross-talk and moving line stains.

Figure 10:
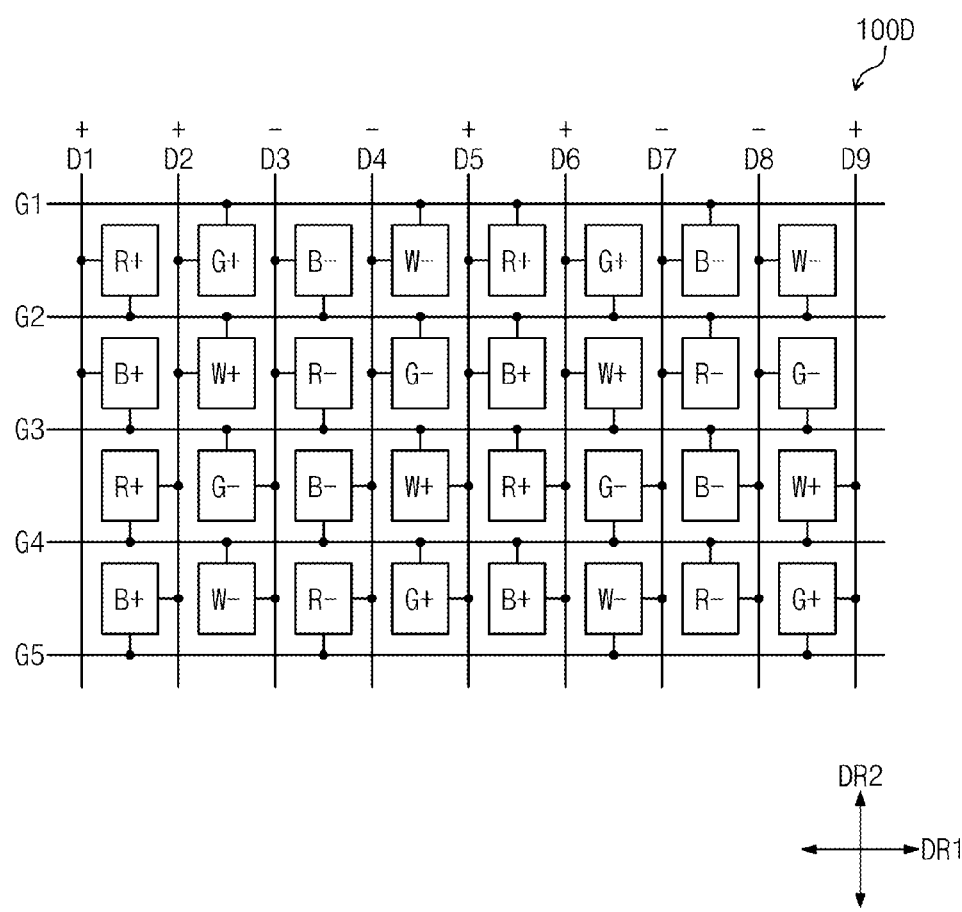

Referring to FIG. 10, the h-th row pixels are disposed between a k-th gate line and a (k+1)-th gate line of the liquid crystal panel 100D. The connections to the k-th gate line and the (k+1)-th gate line in adjacent groups of four h-th row pixels may be inverted. Furthermore, the pixels in each group of four h-th row pixels alternately connect to the k-th gate line and the (k+1)-th gate line every one pixel unit. That is, as shown in FIG. 10, when k and h are equal to 1, the first four pixels (i.e., a first group of four pixels) among the first row pixels may be sequentially connected to the first gate line G1, the second gate line G2, the first gate line G1, and the second gate line G2. The next four pixels (i.e., an adjacent group of four pixels) may be sequentially connected to the second gate line G2, the first gate line G1, the second gate line G2, and the first gate line G1 (i.e., connections to the gate lines in the adjacent group are inverted compared to those of the first group).

Referring to FIG. 10, because the pixels that receive a positive data voltage during an i-th frame and the pixels that receive a negative data voltage during the i-th frame have the same data line and gate line connection structure, there is no brightness difference and flicker may not be observed at each frame. Additionally, similar to that of FIG. 3, the liquid crystal panel 100D according to the embodiment of FIG. 10 may prevent or otherwise reduce occurrences of horizontal cross-talk and moving line stains.

The liquid crystal panels 100E to 100H shown in FIGS. 11 to 14 differ from the liquid crystal panels 100A to 100D of FIGS. 6 to 10 at least in that the pixels constituting one column alternately connect to adjacent left and right data lines every four pixel units. The other aspects may be substantially the same. Referring to FIGS. 11 to 14, pixels of a u-th (u is a natural number) column between a j-th (j is a natural number) data line and a (j+1)-th data line may be alternately connected to the j-th data line and the (j+1)-th data line every four pixels. Hereinafter, the case in which j and u are equal to 1 is described with reference to FIGS. 11 to 14.

Figure 11:
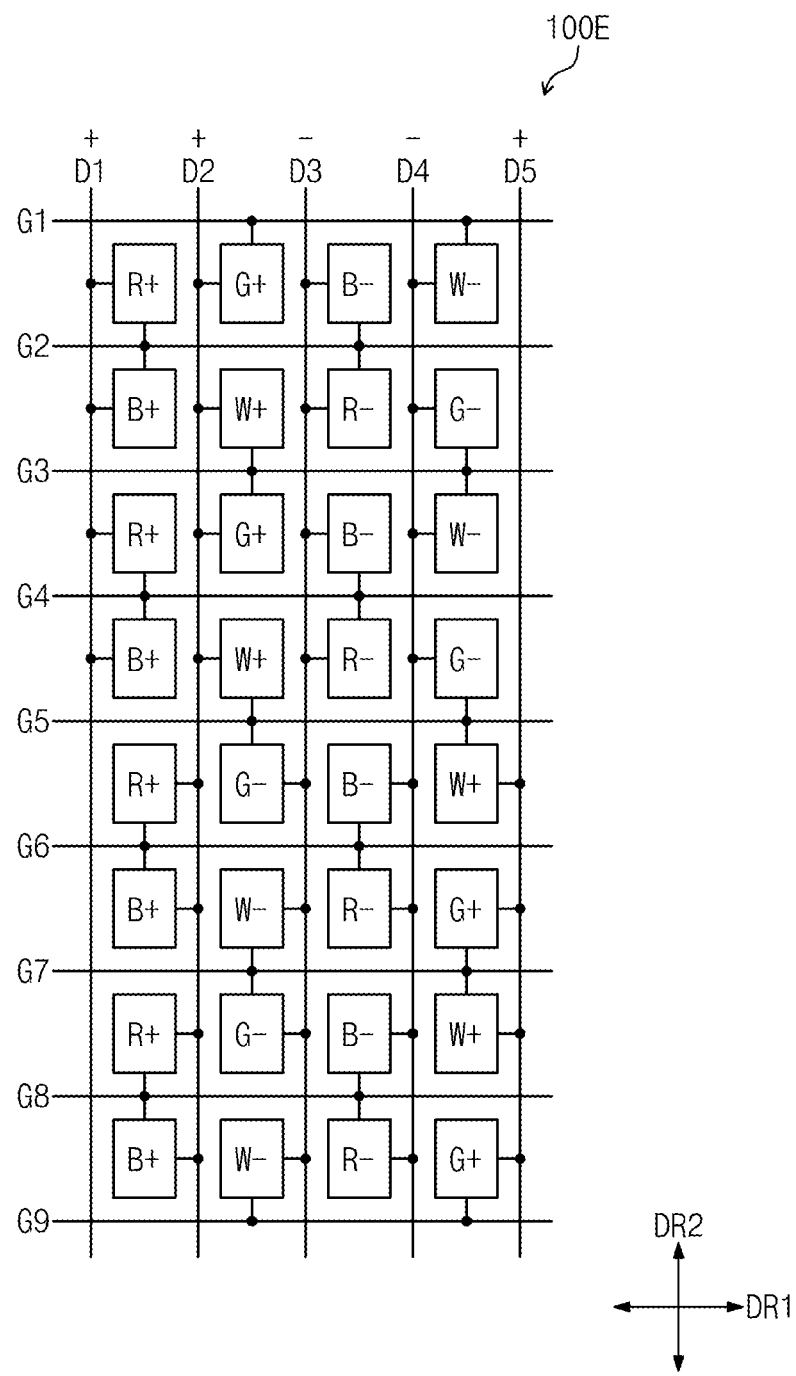
Figure 12:
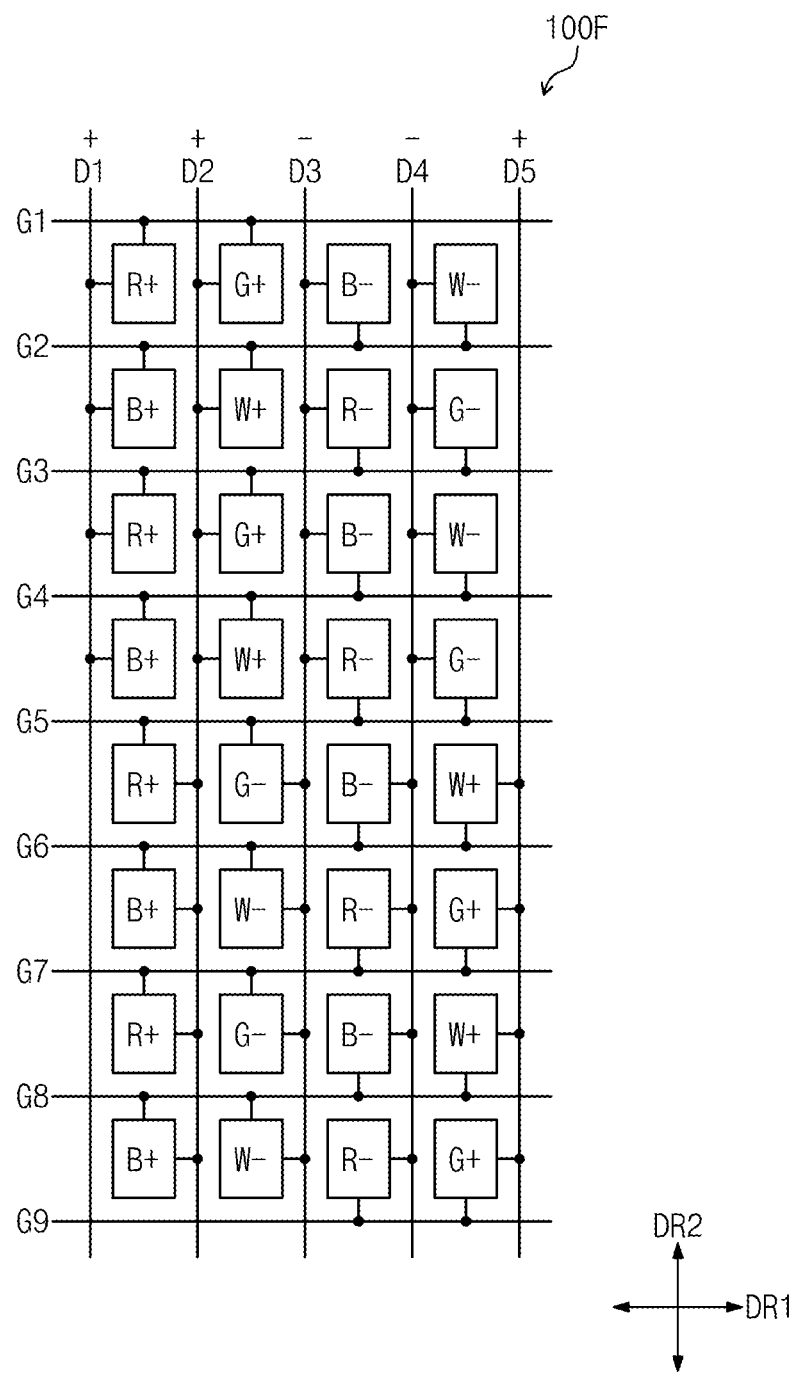
Figure 13:
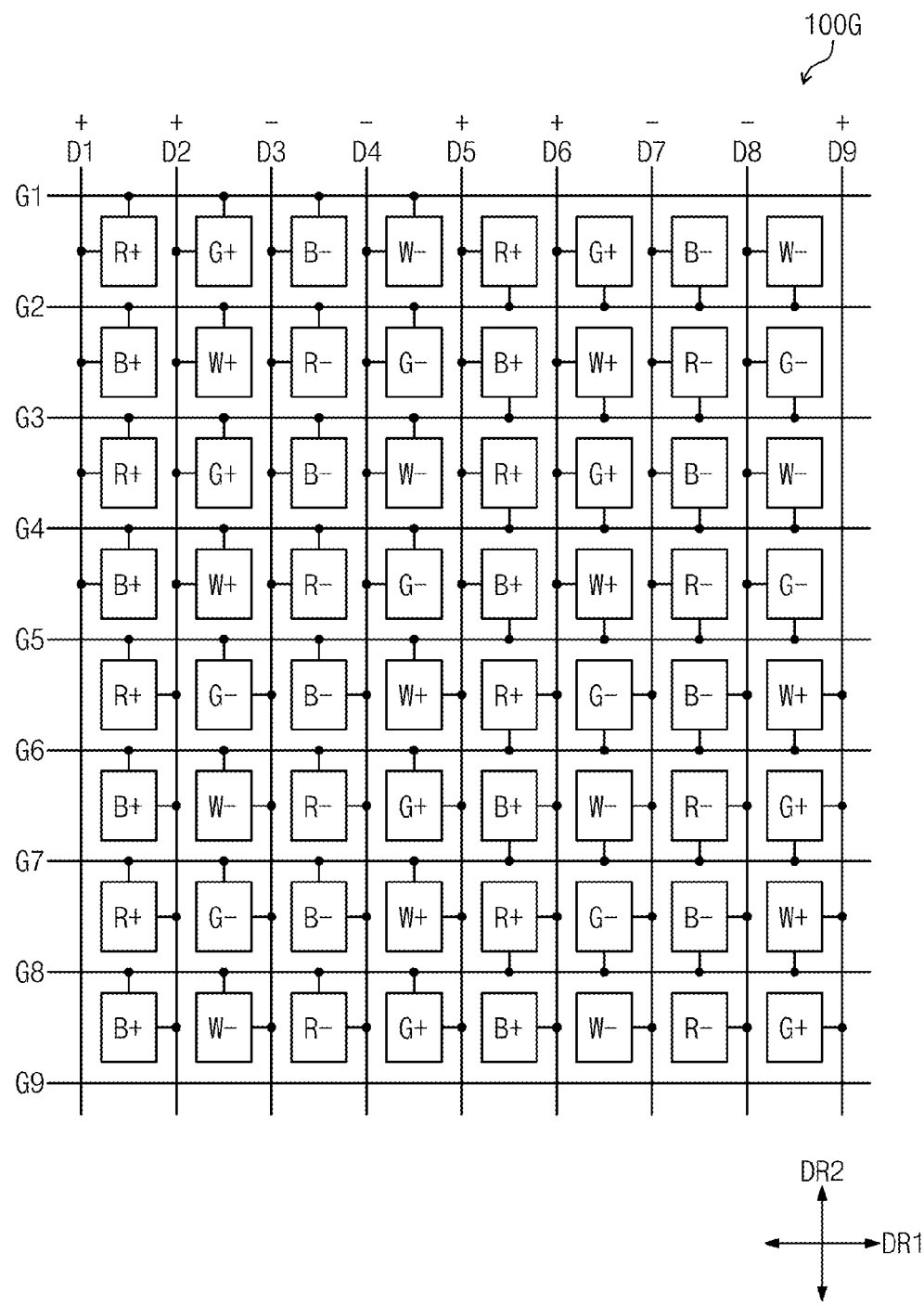
Figure 14:
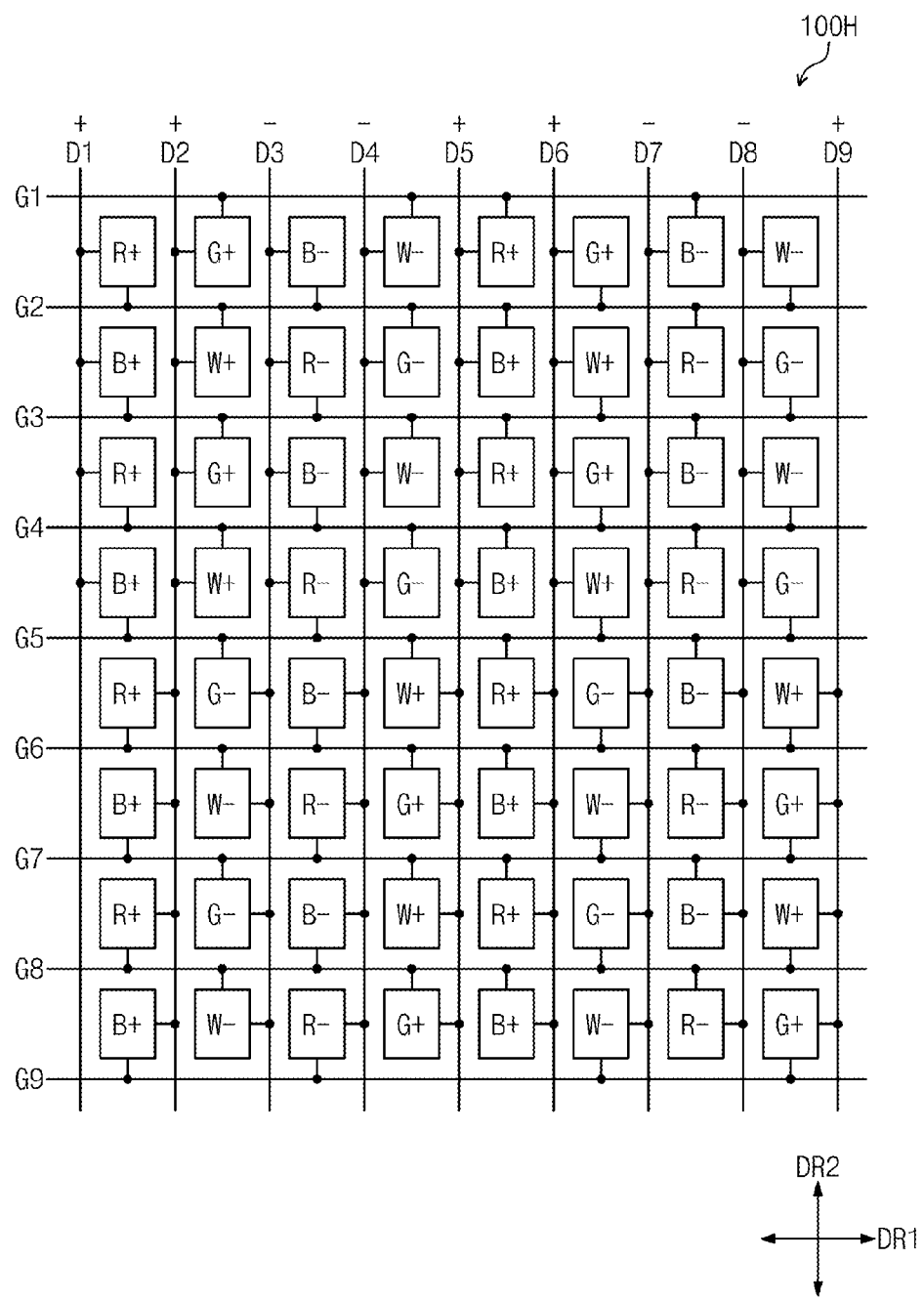

Pixels of the first column disposed between the first data line D1 and the second data line D2 may be alternately connected to the first data line D1 and the second data line D2 every four pixel units. That is, pixels constituting one column may be alternately connected to the left and right adjacent data lines every four row units. For example, FIG. 11 shows that the first row red pixel R+, the second row blue pixel B+, the third row red pixel R+, and the fourth row blue pixel B+ among the first column pixels may be connected to the first data line D1. The fifth row red pixel R+, the sixth row blue pixel B+, the seventh row red pixel R+, and the eighth row blue pixel B+ may be connected to the second data line D2.

The liquid crystal panels 100E to 100H shown in FIGS. 11 to 14 may have substantially the same effect as the liquid crystal panels 100A to 100D shown in FIGS. 6 to 10, respectively.

Figure 15:
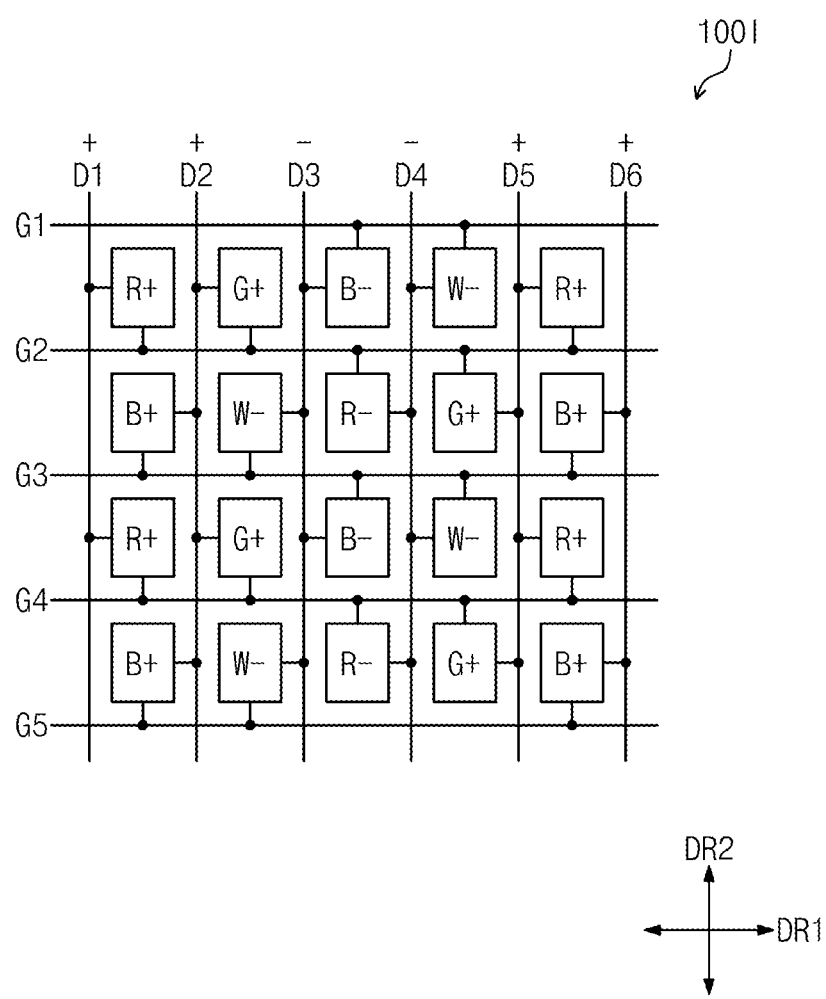
Figure 16:
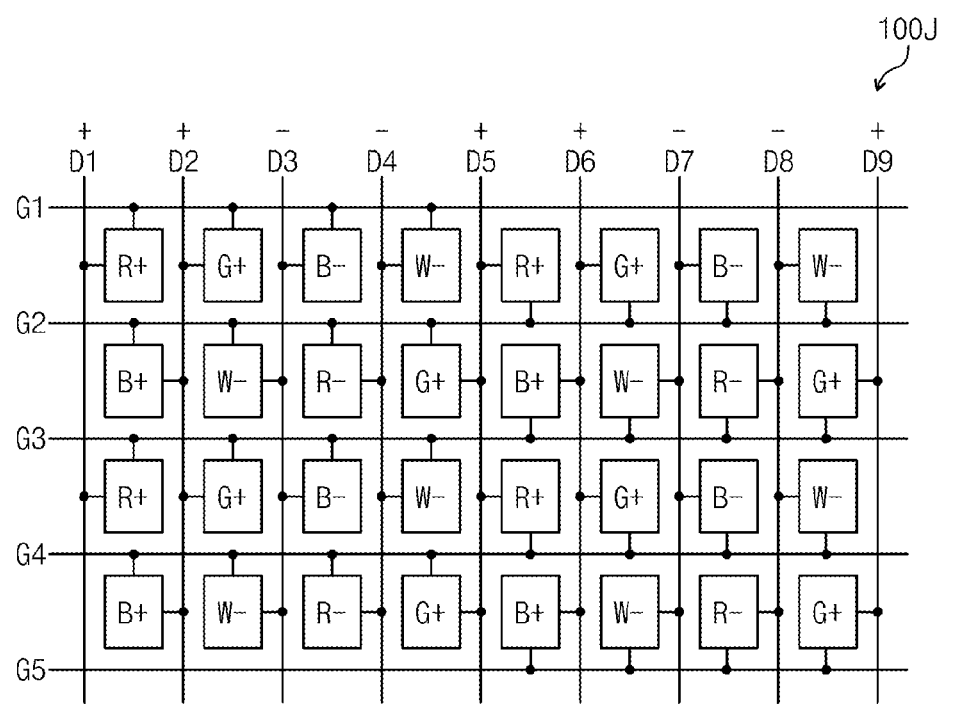
Figure 16:
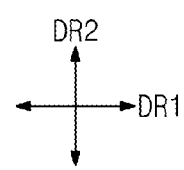
Figure 17:
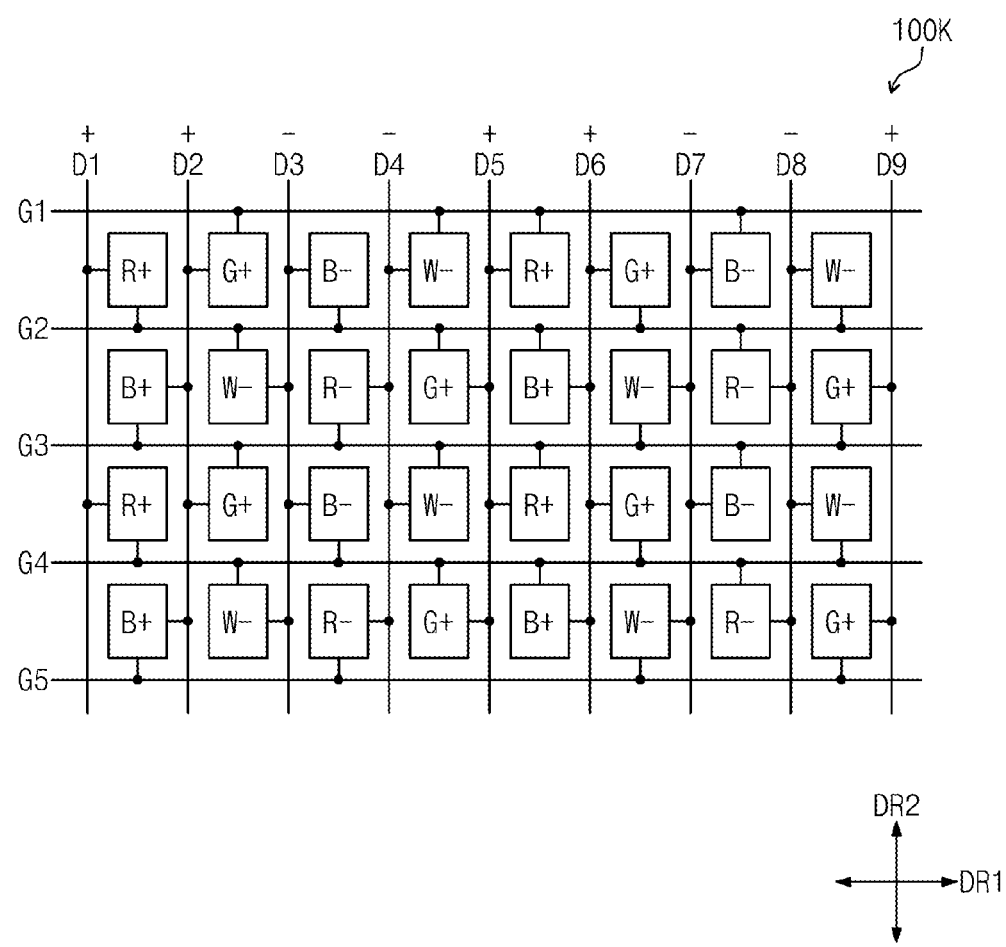

The liquid crystal panels 100I to 100K shown in FIGS. 15 to 17 differ from the the liquid crystal panels 100B to 100D of FIGS. 7 to 9 at least in that pixels constituting one column alternately connect to adjacent left and right data lines every one pixel unit. The other aspects may be substantially the same. Referring to FIGS. 15 to 17, pixels of a u-th (u is a natural number) column between a j-th (j is a natural number) data line and a (j+1)-th data line may be alternately connected to the j-th data line and the (j+1)-th data line every one pixel unit. Hereinafter, the case in which j and u are equal to 1 is described with reference to FIGS. 15 to 17.

Pixels of the first column disposed between the first data line D1 and the second data line D2 may be alternately connected to the first data line D1 and the second data line D2 every one pixel unit. That is, pixels constituting one column may be alternately connected to the left and right adjacent data lines every one row unit. For example, FIG. 15 shows that the first row red pixel R+ among the first column pixels is connected to the first data line D1, the second row blue pixel B+ is connected to the second data line D2, the third row red pixel R+ is connected to the first data line D1, and the fourth row blue pixel B+ is connected to the second data line D2.

The liquid crystal panels 100I to 100K shown in FIGS. 15 to 17 may have substantially the same effect as the liquid crystal panels 100B to 100D shown in FIGS. 7 to 10, respectively.

Figure 18:
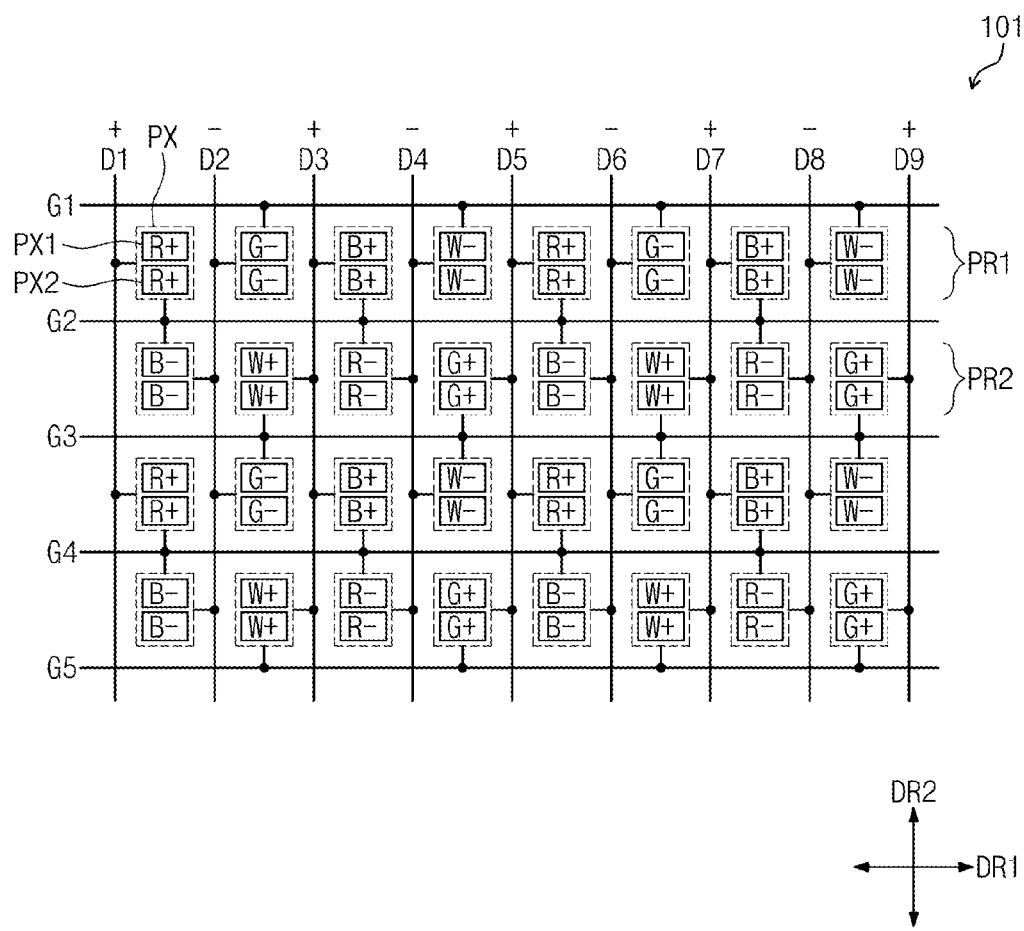
FIG. 18 is a plan view that illustrates a portion of a liquid crystal panel according to an embodiment of the present system and method.

FIG. 18 is a plan view that illustrates a portion of a liquid crystal panel according to an embodiment of the present system and method. The liquid crystal panel 101 shown in FIG. 18 includes a plurality of pixels PX. Each pixel PX may include a first pixel PX1 and a second pixel PX2, which display different gradations of images. The first pixel PX1 and the second pixel PX2 may be connected to the same gate line and the same data line. The first pixel PX1 and the second pixel PX2 may receive the same polarity of data voltage and charge to different levels of pixel voltages, so that the visibility of the pixel may be improved. The pixel PX of FIG. 18 may be applied to all the above-described liquid crystal panels of FIGS. 3 and 6 to 17.

Figure 19:
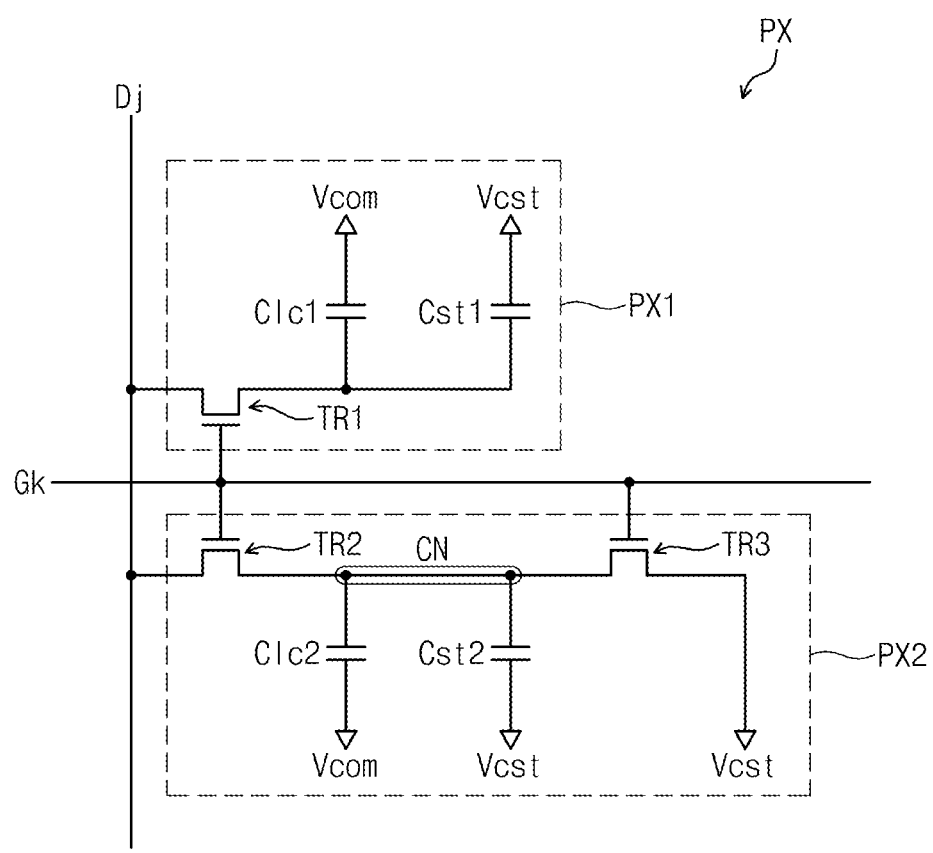
FIGS. 19 and 20 are circuit diagrams that illustrate one pixel of the liquid crystal panel of FIG. 1, according to one or more embodiments of the present system and method.

FIG. 19 is a circuit diagram that illustrates one pixel of the liquid crystal panel of FIG. 18, according to an embodiment of the present system and method. Referring to FIG. 19, the pixel PX includes a first pixel PX1 and a second pixel PX2. The first pixel PX1 includes a first transistor TR1, a first liquid crystal capacitor Clc2, and a first storage capacitor Cst2. The second pixel PX2 includes a second transistor TR2, a third transistor TR3, a second liquid crystal capacitor Clc2, and a second storage capacitor Cst2.

A gate electrode of the first transistor TR1 is connected to the k-th gate line Gk, a source electrode of the first transistor TR1 is connected to the j-th data line Dj, and a drain electrode of the first transistor TR1 is connected to the first liquid crystal capacitor Clc1 and the first storage capacitor Cst1.

A first electrode of the first liquid crystal capacitor Clc1 is connected to the drain electrode of the first transistor TR1 and a second electrode of the first liquid crystal capacitor Clc1 receives a common voltage Vcom. A first electrode of the first storage capacitor Cst1 is connected to the drain electrode of the first transistor TR1 and a second electrode of the first storage capacitor Cst1 receives a storage voltage Vcst.

A gate electrode of the second transistor TR2 is connected to the k-th gate line Gk, a source electrode of the second transistor TR2 is connected to the j-th data line Dj, and a drain electrode of the second transistor TR2 is connected to the second liquid crystal capacitor Clc2 and the second storage capacitor Cst2.

A gate electrode of the third transistor TR3 is connected to the k-th gate line Gk, a source electrode of the third transistor TR3 receives the storage voltage Vcst, and a drain electrode of the third transistor TR3 is connected to the drain electrode of the second transistor TR2.

A first electrode of the second liquid crystal capacitor Clc2 is connected to the drain electrode of the second transistor TR2 and a second electrode of the second liquid crystal capacitor Clc2 receives the common voltage Vcom. A first electrode of the second storage capacitor Cst2 is connected to the drain electrode of the second transistor TR2 and a second electrode of the second storage capacitor Cst2 receives the storage voltage Vcst.

In response to a gate signal provided through the k-th gate line Gk, the first to third transistors TR1 to TR3 are turned on. Through the turned-on first transistor TR1, a data voltage is provided through the j-th data line Dj to the first pixel PX1. During this time, the first liquid crystal capacitor Clc1 is charged with a first pixel voltage that corresponds to a level difference of the data voltage and the common voltage Vcom.

Through the turned-on second transistor TR2, a data voltage is provided through the j-th data line Dj to the second pixel PX2 and through the turned-on third transistor TR3, the storage voltage Vcst is provided to the second pixel PX2. During this time, the second liquid crystal capacitor Clc2 is charged with a second pixel voltage that corresponds to a level difference of the distribution voltage and the common voltage Vcom. The data voltage may have one of a positive polarity and a negative polarity. The common voltage Vcom may have substantially the same voltage as the storage voltage Vcst.

A voltage (hereinafter referred to as distribution voltage) at a contact node CN where the drain electrode of the second transistor TR2 and the drain electrode of the third transistor TR3 are connected is a voltage distributed by a resistance value when the first and second transistors TR1 and TR2 are turned on. That is, the distribution voltage has a value between a data voltage provided through the turned-on second transistor TR2 and a storage voltage Vcst provided through the third transistor TR3.

Since the first pixel voltage that is charged to the first liquid crystal capacitor Clc1 and the second pixel voltage that is charged to the second liquid crystal capacitor Clc2 are different from each other, a gradation displayed by the first pixel PX1 is different from that displayed by the second pixel PX2. In such a manner, by displaying different gradations of images by the first and second pixels PX1 and PX2, the visibility of the pixel PX may be improved.

Figure 20:
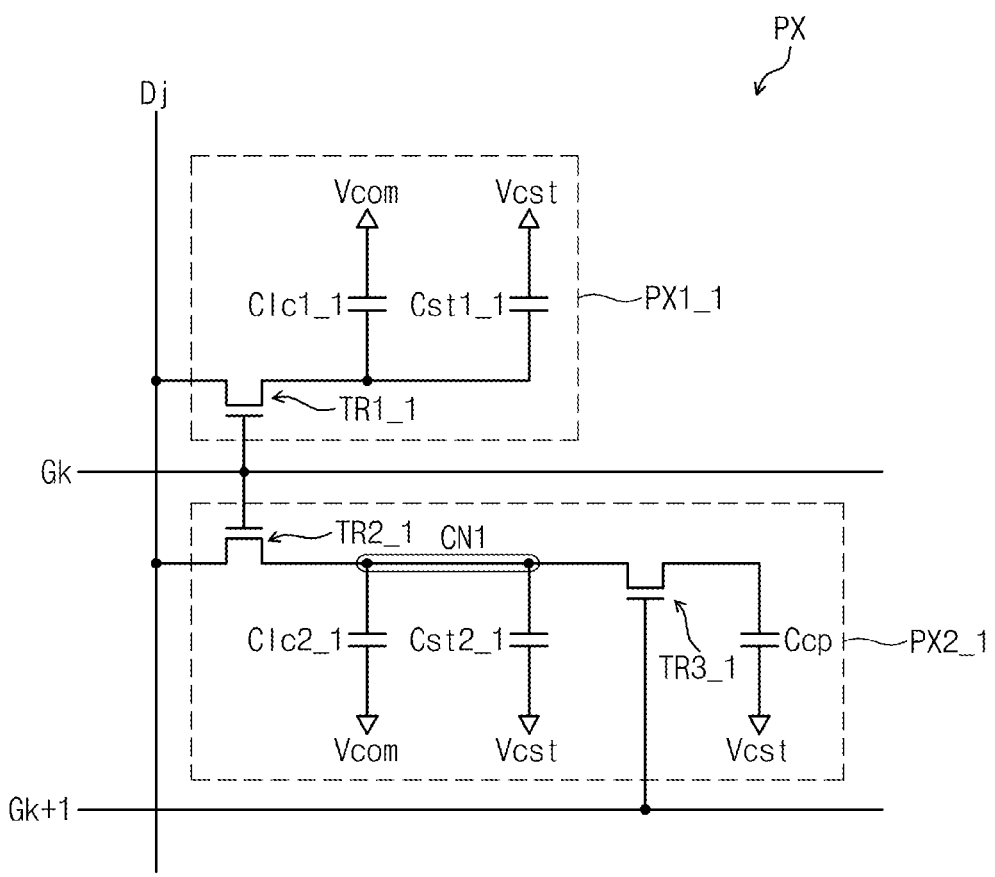

FIG. 20 is a circuit diagram that illustrates one pixel of the liquid crystal panel of FIG. according to an embodiment of the present system and method. 18. Referring to FIG. 20, the pixel PX includes a first sub-pixel PX1_1 and a second sub-pixel PX2_1.

The first sub-pixel PX1_1 includes a first transistor TR1_1, a first liquid crystal capacitor Clc1_1, and a first storage capacitor Cst1_1. The second sub-pixel PX2_1 includes a second transistor TR2_1, a third transistor TR3_1, a second liquid crystal capacitor Clc1_1, a second storage capacitor Cst2_1, and a coupling capacitor Ccp.

A gate electrode of the first transistor TR1_1 is connected to the k-th gate line Gk, a source electrode of the first transistor TR1_1 is connected to the j-th data line Dj, and a drain electrode of the first transistor TR1_1 is connected to the first liquid crystal capacitor Clc1_1 and the first storage capacitor Cst1_1.

A first electrode of the first liquid crystal capacitor Clc1_1 is connected to the drain electrode of the first transistor TR11 and a second electrode of the first liquid crystal capacitor Clc1_1 receives a common voltage Vcom. A first electrode of the first storage capacitor Cst1_1 is connected to the drain electrode of the first transistor TR1_1 and a second electrode of the first storage capacitor Cst1_1 receives a storage voltage Vcst.

A gate electrode of the second transistor TR2_1 is connected to the k-th gate line Gk, a source electrode of the second transistor TR2_1 is connected to the j-th data line Dj, and a drain electrode of the second transistor TR2_1 is connected to the second liquid crystal capacitor Clc2_1 and the second storage capacitor Cst2_1.

A gate electrode of the third transistor TR3_1 is connected to the (k+1)-th gate line Gk+1, a source electrode of the third transistor TR3 is connected to the coupling capacitor Ccp, and a drain electrode of the third transistor TR3 is connected to the drain electrode of the second transistor TR2. However, the present system and method are not limited thereto and the third transistor TR3_1 may be connected to a (k+y)-th (y is a natural number of 2 or more) gate line.

A first electrode of the second liquid crystal capacitor Clc2_1 is connected to the drain electrode of the second transistor TR2_1 and a second electrode of the second liquid crystal capacitor Clc_1 receives the common voltage Vcom. A first electrode of the second storage capacitor Cst2_1 is connected to the drain electrode of the second transistor TR21 and a second electrode of the second storage capacitor Cst2_1 receives the storage voltage Vcst. A first electrode of the coupling capacitor Ccp is connected to the source electrode of the third transistor TR3_1 and a second electrode of the coupling capacitor Ccp receives the storage voltage Vcst.

In response to a gate signal provided through the k-th gate line Gk, the first and second transistors TR1_1 to TR2_1 are turned on. Through the turned-on first transistor TR1_1 and second transistor TR2_1, a data voltage is provided through the j-th data line Dj to the first sub-pixel PX1_1 and the second sub-pixel PX2_1.

The first liquid crystal capacitor Clc1_1 and the second liquid crystal capacitor Clc2_1 are charged with a first pixel voltage that corresponds to a level difference of the data voltage and the common voltage Vcom. The data voltage may have one of a positive polarity and a negative polarity.

The common voltage Vcom may have substantially the same voltage as the storage voltage Vcst.

Then, in response to a gate signal provided through the (k+1)-th gate line Gk+1, the third transistor TR3 is turned on, which creates a voltage distribution between the second liquid capacitor Clc_1 and the coupling capacitor Ccp. A distribution voltage at a contact node CN1 where the drain electrode of the second transistor TR2_1 and the drain electrode of the third transistor TR3_1 are connected is distributed such that charges are stored and shared among the second liquid crystal capacitor Clc2_1, the second storage capacitor Cst2_1, and the coupling capacitor Ccp.

When a gate signal is applied through the (k+1)-th gate line Gk+1, a voltage charged to the second liquid crystal capacitor Clc2_1 is reduced. During the same time, the first liquid crystal capacitor Clc1_1 is charged with the first pixel voltage and the second liquid crystal capacitor Clc2_1 is charged with a second pixel voltage that has a lower level than the first pixel voltage. Furthermore, when a gate signal is applied through the (K+1)-th gate line Gk+1, the first sub-pixel PX1_1 and the second sub-pixel PX2_1 display different gradations because the first pixel voltage that is charged to the first liquid crystal capacitor Clc1_1 and the second pixel voltage that is charged to the second liquid crystal capacitor Clc2_1 are different from each other. In such a manner, by displaying different gradations of images by the first and second sub-pixels PX1_1 and PX2_1, the visibility of the pixel PX may be improved.

Figure 21:
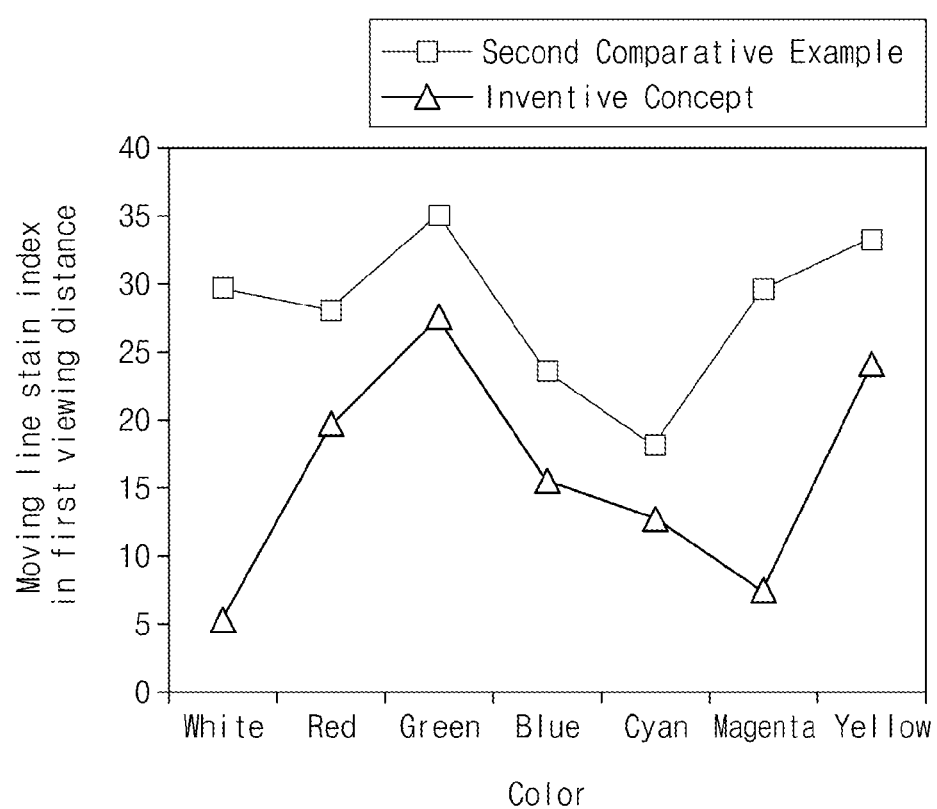
FIG. 21 is a simulation graph that illustrates a moving line stain index for each color in a first viewing distance with respect to a liquid crystal panel of the present system and method and a liquid crystal panel of a second comparative example.
Figure 22:
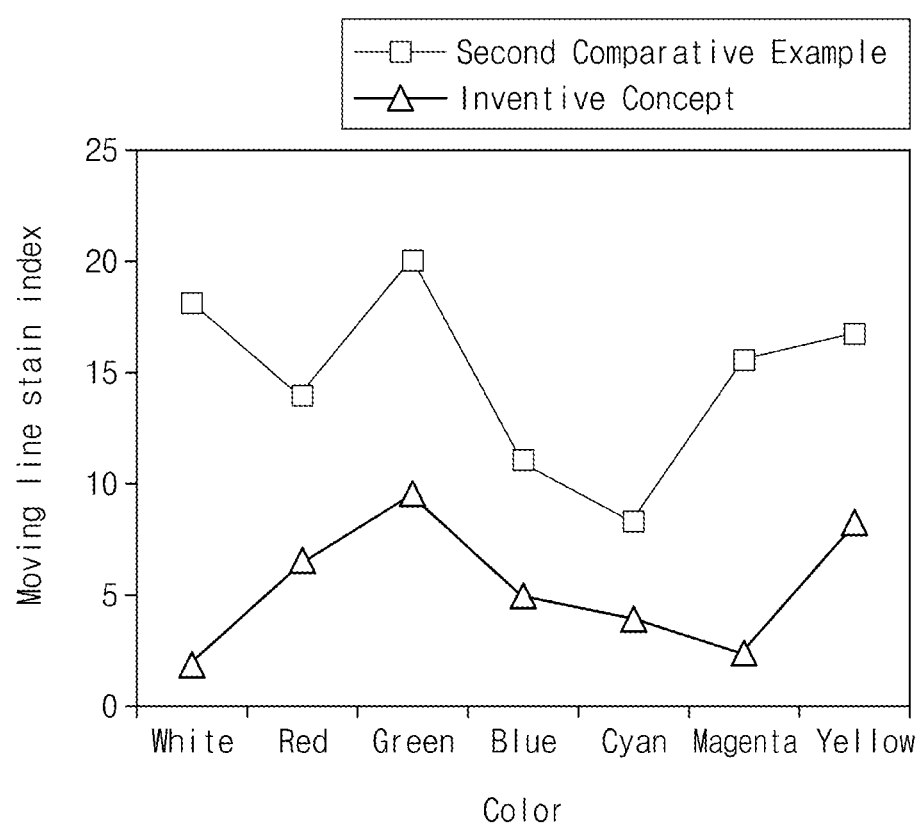
FIG. 22 is a simulation graph that illustrates a moving line stain index for each color in a second viewing distance with respect to a liquid crystal panel of the present system and method and a liquid crystal panel of a second comparative example.

FIG. 21 is a simulation graph that illustrates a moving line stain index for each color in a first viewing distance with respect to a liquid crystal panel of the present system and method and a liquid crystal panel of a second comparative example. FIG. 22 is a simulation graph that illustrates a moving line stain index for each color in a second viewing distance with respect to a liquid crystal panel of the present system and method and a liquid crystal panel of a second comparative example.

Table 1 shows a moving line stain index in a first viewing distance with respect to a liquid crystal panel of the present system and method and a liquid crystal panel of a second comparative example.

Referring to Table 1 and FIG. 21, the liquid crystal panel labeled "Inventive Concept" reduces a moving line stain phenomenon in all colors compared to the liquid crystal panel labeled "Second Comparative Example." Specifically, FIG. 21 shows that when a viewing distance is about 20 cm, compared to the liquid crystal panel labeled "Second Comparative Example," the liquid crystal panel labeled "Inventive Concept" exhibited improvements of about 82% when a moving line stain is white color, about 30% when a moving line stain is red color, about 21% when a moving line stain is green color, about 34% when a moving line stain is blue color, about 29% when a moving line stain is cyan color, about 75% when a moving line stain is magenta color, and about 28% when a moving line stain is yellow color.

Referring to FIG. 22, when a viewing distance is about 50 cm, compared to the liquid crystal panel labeled "Second Comparative Example," the liquid crystal panel labeled "Inventive Concept" exhibits improvements of about 90% when a moving line stain is white color and about 50% on average when the color is one of red, green, blue, cyan, and yellow.

Figure 23:
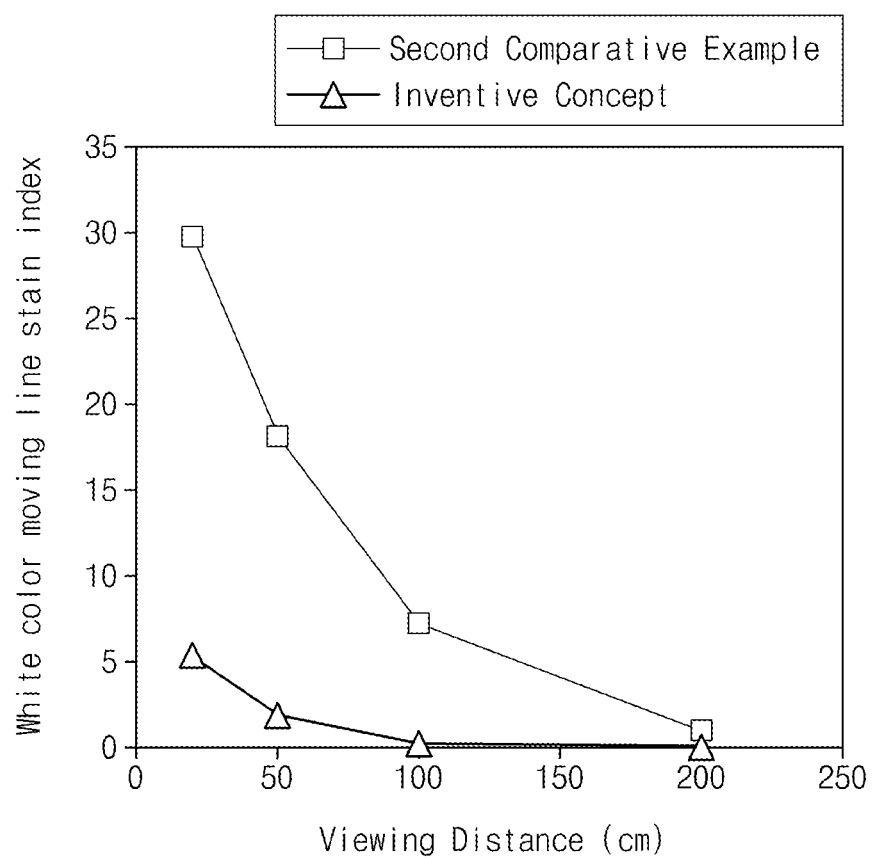
FIG. 23 is a simulation graph that illustrates a moving line stain index for white color in each viewing distance with respect to a liquid crystal panel of the present system and method and a liquid crystal panel of a second comparative example.
Figure 24:
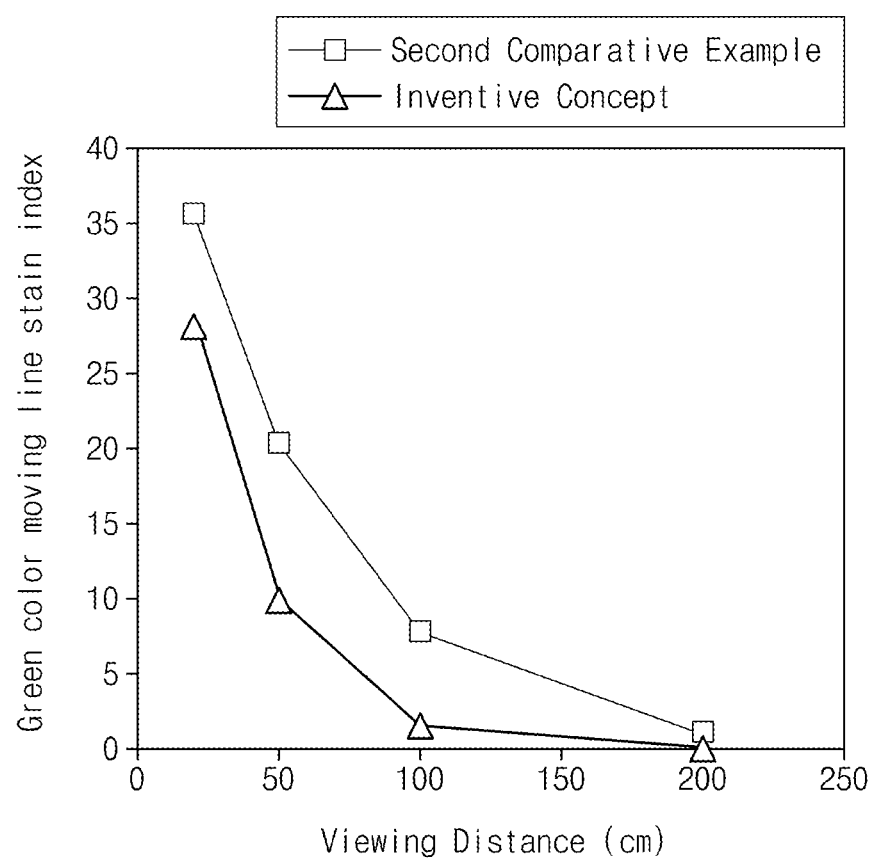
FIG. 24 is a simulation graph that illustrates a moving line stain index for green color in each viewing distance with respect to a liquid crystal panel of the present system and method and a liquid crystal panel of a second comparative example.

FIG. 23 is a simulation graph that illustrates a moving line stain index for white color in a first viewing distance with respect to a liquid crystal panel of the present system and method and a liquid crystal panel of a second comparative example. FIG. 24 is a simulation graph that illustrates a moving line stain index for green color in a second viewing distance with respect to a liquid crystal panel of the present system and method and a liquid crystal panel of a second comparative example.

Referring to FIG. 23 and FIG. 24, the liquid crystal panel of the present system and method reduces a moving line stain in white and green colors within a viewing distance of less than about 200 cm, compared to the liquid crystal pane of the second comparative example.

Hereinafter, a driving method of a display device according to an embodiment of the present system and method is described.

Figure 25:
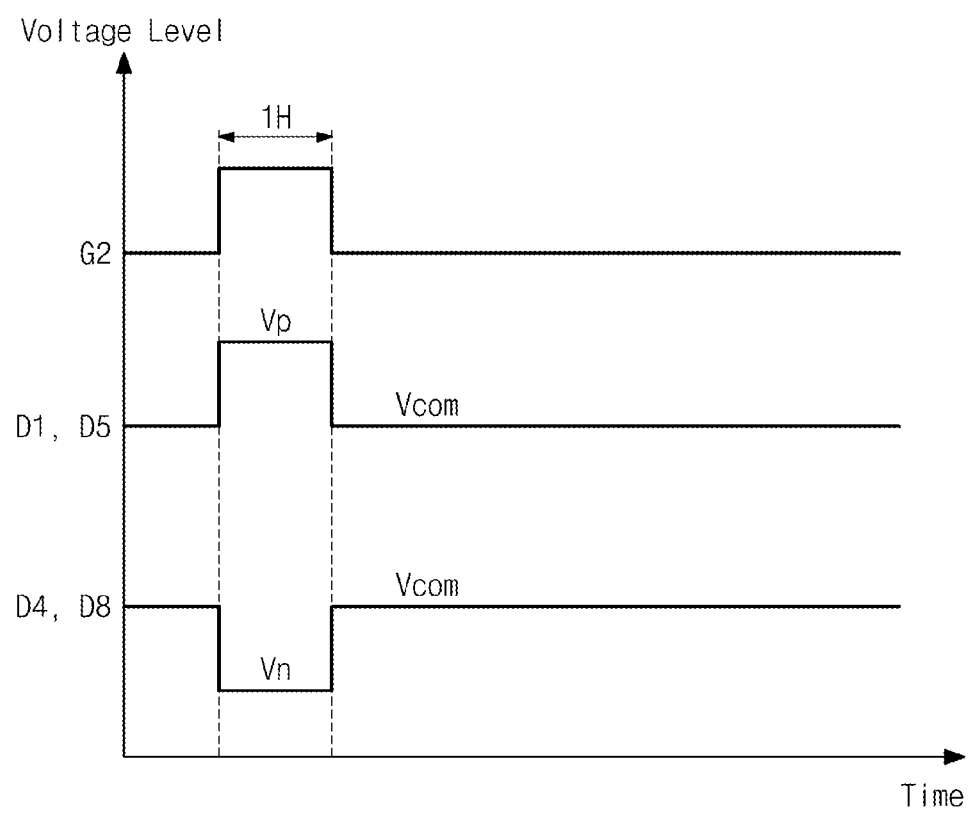
FIG. 25 is a timing diagram that illustrates a gate signal and a data voltage applied during one horizontal period in a display device according to an embodiment of the present system and method.

FIG. 25 is a timing diagram that illustrates a gate signal and a data voltage being applied during one horizontal period in a display device according to an embodiment of the present system and method.

TABLE 1

| Viewing distance | | color | | | | | | |
|---|---|---|---|---|---|---|---|---|
| 20 cm | | White | Red | Green | Blue | Cyan | Magenta | Yellow |
| Moving line stain index | Second comparative example | 30 | 28 | 35 | 24 | 18 | 30 | 33 |
| | Inventive concept | 5 | 20 | 28 | 16 | 13 | 7 | 24 |

The liquid crystal panel labeled "Inventive Concept" in FIGS. 21 and 22 and Table 1 may correspond to the liquid crystal panel 100 shown in FIG. 3 and the liquid crystal panel labeled "Second Comparative Example" may correspond to the liquid crystal panel 1B shown in FIG. 4B. Additionally, the first viewing distance may be about 20 cm and the second viewing distance may be about 50 cm. The moving line stain index is a value obtained by quantifying the degree of visible moving line stain by reflecting the visual characteristic of a human's eye. A higher moving line stain index corresponds to a moving line stain that is more visible, and vice versa, a lower moving line stain index corresponds to a moving line stain that is less visible.

Referring to FIGS. 3 and 25, the driving method of the display device includes: applying a gate signal to a (k+1)-th gate line during a first horizontal period; applying a first polarity data voltage to a first pixel connected to the (k+1)-th gate line and displaying a first color in synchronization with the first horizontal period; and applying a second polarity data voltage different from the first polarity data voltage to a second pixel connected to the (k+1)-th gate line and displaying the first color in synchronization with the first horizontal period.

The first pixel and the second pixel may be spaced apart from each other in a gate line extension direction DR1 and a data line extension direction DR2. The first pixel and the second pixel may form different rows and different columns.

The case that red pixels included in the first pixel row PR1 and the second pixel row PR2 is described exemplarily.

A gate signal is applied to the second gate line G2 during a first horizontal period 1H. A positive data voltage Vp is applied to the first data line D1 and the fifth data line D5 in synchronization with the first horizontal period 1H. Additionally, a negative data voltage Vn is applied to the fourth data line D4 and the eighth data line D8 in synchronization with the first horizontal period 1H.

A positive data voltage may be applied to red pixels included in the first pixel row PR1 and a negative data voltage may be applied to red pixels included in the second pixel row PR2.

According to a display device and a driving method thereof of the present system and method, occurrences of a horizontal cross-talk phenomenon and a moving line stain phenomenon may be reduced simultaneously. Additionally, according to a display device of the present system and method, visible flicker due to a brightness difference at each frame may be prevented or otherwise reduced.

While embodiments of the present system and method are described with reference to the accompanying drawings, a person skilled in the art would understand that the described embodiments may be modified in various different ways, all without departing from the spirit or scope of the present system and method. Therefore, the above-described embodiments should be understood to be illustrative and not limiting.

What is claimed is:

1. A display device comprising:
   a plurality of gate lines extending in a first direction;
   a plurality of data lines extending in a second direction that intersects the first direction; and
   a plurality of pixels connected to the gate lines and the data lines,
   wherein the plurality of pixels comprise h-th row pixels (h is a natural number) and (h+1)-th row pixels, which are adjacent to each other in the second direction, with a (k+1)-th gate line (k is a natural number) therebetween among the plurality of gate lines, and
   a first pixel configured to display a first color and connected to the (k+1)-th gate line among the h-th row pixels and a second pixel configured to display the first color and connected to the (k+1)-th gate line among the (h+1)-th row pixels are spaced apart from each other in the first direction and receive different polarities of data voltages, and
   wherein the plurality of pixels further comprise (h+2)-th row pixels with a (k+2)-th gate line between the (h+1)-th row pixels and (h+2)-th row pixels,
   the h-th row pixels and the (h+1)-th row pixels in odd-numbered pixel columns are connected to the (k+1)-th gate line, and
   the (h+1)-th row pixels and the (h+2)-th row pixels in even-numbered pixel columns are connected to the (k+2)-th gate line.

2. The device of claim 1, wherein the first color is one of red, green, blue, and white.

3. The device of claim 1, wherein
   the h-th row pixels comprise a first pixel group and a second pixel group, which are sequentially arranged in the first direction;
   the (h+1)-th row pixels comprise a third pixel group and a fourth pixel group, which are sequentially arranged in the first direction; and
   each of the first to fourth pixel groups comprises an even number of pixels.

4. The device of claim 3, wherein
   each of the first pixel group and the fourth pixel group comprises two pixels of a red pixel, a green pixel, a blue pixel, and a white pixel; and
   each of the second pixel group and the third pixel group comprises two pixels of the red pixel, the green pixel, the blue pixel, and the white pixel that are not in the first and fourth pixel groups.

5. The device of claim 1, wherein
   when the first pixel is included in a (2u−1)-th pixel column (u is a natural number), the second pixel is included in a (2u+1)-th pixel column; and
   when the first pixel is included in a 2u-th pixel column, the second pixel is included in a (2u+2)-th pixel column.

6. The device of claim 1, wherein
   two pixels in a (2u−1)-th pixel column (u is a natural number) that are adjacent to each other in the second direction with a 2k-th gate line therebetween are connected to each other by sharing the 2k-th gate line; and
   two pixels in a 2u-th pixel column that are adjacent to each other in the second direction with a (2k−1)-th gate line therebetween are connected to each other by sharing the (2k−1)-th gate line.

7. The device of claim 1, wherein two pixels in a (2u−1)-th pixel column (u is a natural number) that are adjacent to each other in the second direction with a (2k−1)-th gate line therebetween are connected to each other by sharing the (2k−1)-th gate line; and
   two pixels in a 2u-th pixel column that are adjacent to each other in the second direction with a 2k-th gate line therebetween are connected to each other by sharing the 2k-th gate line.

8. The device of claim 1, wherein u-th column pixels (u is a natural number) disposed between a j-th data line (j is a natural number) and a (j+1)-th data line among the data lines are alternately connected to the j-th data line and the (j+1)-th data line every one pixel.

9. The device of claim 8, wherein a polarity of a data voltage applied to the data lines is inverted every one data line.

10. The device of claim 8, wherein the h-th row pixels disposed between a k-th gate line and the (k+1)-th gate line among the gate lines are alternately connected to the k-th gate line and the (k+1)-th gate line every one pixel.

11. The device of claim 1, wherein u-th column pixels (u is a natural number) disposed between a j-th data line (j is a natural number) and a (j+1)-th data line among the data lines are alternately connected to the j-th data line and the (j+1)-th data line every two pixels.

12. The device of claim 11, wherein a polarity of a data voltage applied to the data lines is inverted every two data lines.

13. The device of claim 12, wherein the h-th row pixels disposed between a k-th gate line and the (k+1)-th gate line among the gate lines are alternately connected to the k-th gate line and the (k+1)-th gate line every two pixels.

14. The device of claim 13, wherein a number of pixels receiving a positive data voltage during an i-th frame (i is a natural number) and having a first connection structure is equal to a number of pixels receiving a negative data voltage during the i-th frame and having the first connection structure.

15. The device of claim 1, wherein the h-th row pixels disposed between a k-th gate line and the (k+1)-th gate line among the gate lines are alternately connected to the k-th gate line and the (k+1)-th gate line every four pixels.

16. The device of claim 1, wherein adjacent groups of four h-th row pixels disposed between a k-th gate line and the (k+1)-th gate line among the gate lines are inversely connected to the k-th gate line and the (k+1)-th gate line.

17. The device of claim 16, wherein pixels within one of the groups of four h-th row pixels are alternately connected to the k-th gate line and the (k+1)-th gate line every one pixel.

18. The device of claim 1, wherein u-th column pixels (u is a natural number) disposed between a j-th data line (j is a natural number) and a (j+1)-th data line among the data lines are alternately connected to the j-th data line and the (j+1)-th data line every four pixels.

19. The device of claim 18, wherein the h-th row pixels disposed between a k-th gate line and the (k+1)-th gate line among the gate lines are alternately connected to the k-th gate line and the (k+1)-th gate line every one pixel.

20. The device of claim 18, wherein h-th row pixels disposed between a k-th gate line and the (k+1)-th gate line among the gate lines are alternately connected to the k-th gate line and the (k+1)-th gate line every two pixels.

21. The device of claim 20, wherein a number of pixels receiving a positive data voltage during an i-th frame (i is a natural number) and having a first connection structure is equal to a number of pixels receiving a negative data voltage during the i-th frame and having the first connection structure.

22. The device of claim 18, wherein h-th row pixels disposed between a k-th gate line and the (k+1)-th gate line among the gate lines are alternately connected to the k-th gate line and the (k+1)-th gate line every four pixels.

23. The device of claim 1, wherein adjacent groups of four h-th row pixels disposed between a k-th gate line and the (k+1)-th gate line among the gate lines are inversely connected to the k-th gate line and the (k+1)-th gate.

24. The device of claim 23, wherein pixels within one of the groups of four h-th row pixels are alternately connected to the k-th gate line and the (k+1)-th gate line every one pixel.

25. The device of claim 1, wherein each of the pixels comprise:
a sub-first pixel; and
a second sub-pixel receiving a data voltage having the same polarity as that of the first pixel and charged to a pixel voltage level different from that of the first pixel.

26. The device of claim 1, wherein the first pixel and the second pixel are spaced apart from each other with pixels in an odd number of columns therebetween in the first direction.

27. A display device comprising:
a plurality of gate lines extending in a first direction;
a plurality of data lines extending in a second direction that intersects the first direction;
a first pixel row comprising a first pixel group and a second pixel group sequentially disposed in the first direction;
a second pixel row comprising a third pixel group and a fourth pixel group, which are sequentially disposed in the first direction, and adjacent to the first pixel row in the second direction,
a third pixel row adjacent to the second pixel row in the second direction;
wherein
the first pixel group comprises a first pixel configured to display a first color;
the fourth pixel group comprises a second pixel configured to display the first color; and
the first pixel and the second pixel are connected to the same gate line and receive different polarities of data voltages, and
wherein the first pixel row pixels and the second pixel row pixels in odd-numbered pixel columns are connected to a (k+1)-th gate line (k is a natural number) disposed between the first and second pixel rows, and
wherein the second pixel row pixels and the third pixel row pixels in even-numbered pixel columns are connected to a (k+2)-th gate line disposed between the second and third pixel rows.

28. The device of claim 27, wherein each of the first to fourth pixel groups comprises an even number of pixels.

29. The device of claim 28, wherein
each of the first pixel group and the fourth pixel group comprises two of a red pixel, a green pixel, a blue pixel, and a white pixel; and
each of the second pixel group and the third pixel group comprises two of the red pixel, the green pixel, the blue pixel, and the white pixel that are not in the first and fourth pixel groups.

30. A method of driving a display device including a plurality of pixels having h-th row pixels (h is a natural number), (h+1)-th row pixels, and (h+2)-th row pixels, which are adjacent to each other in the second direction, with a (k+1)-th gate line (k is a natural number) disposed between the h-th row pixels and (h+1)-th row pixels and a (k+2)-th gate line disposed between the (h+1)-th row pixels and (h+2)-th row pixels, the method comprising:
applying a gate signal to a (k+1)-th gate line (k is a natural number) during a first horizontal period;
applying a data voltage of a first polarity to a first pixel connected to the (k+1)-th gate line and displaying a first color in synchronization with the first horizontal period; and
applying a data voltage of a second polarity different from the first polarity to a second pixel connected to the (k+1)-th gate line and displaying the first color in synchronization with the first horizontal period,
wherein the first pixel and the second pixel are spaced apart from each other in the (k+1)-th gate line extension direction and a data line extension direction,
the h-th row pixels and the (h+1)-th row pixels in odd-numbered pixel columns are connected to the (k+1)-th gate line, and
the (h+1)-th row pixels and the (h+2)-th row pixels in even-numbered pixel columns are connected to the (k+2)-th gate line.

31. The method of claim 30, wherein the first pixel and the second pixel are positioned in different rows and different columns.

32. The method of claim 30, wherein the first polarity is positive and the second polarity is negative.

* * * * *